(12) United States Patent
Lee et al.

(10) Patent No.: US 12,431,943 B2
(45) Date of Patent: Sep. 30, 2025

(54) METHOD FOR CONTROLLING BEAM IN WIRELESS COMMUNICATION SYSTEM, AND APPARATUS THEREFOR

(71) Applicant: LG ELECTRONICS INC., Seoul (KR)

(72) Inventors: Hojae Lee, Seoul (KR); Sangrim Lee, Seoul (KR); Kijun Jeon, Seoul (KR); Jayeong Kim, Seoul (KR); Byungkyu Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 13 days.

(21) Appl. No.: 18/689,321

(22) PCT Filed: Sep. 7, 2021

(86) PCT No.: PCT/KR2021/012147
§ 371 (c)(1),
(2) Date: Mar. 5, 2024

(87) PCT Pub. No.: WO2023/038163
PCT Pub. Date: Mar. 16, 2023

(65) Prior Publication Data
US 2024/0396591 A1 Nov. 28, 2024

(51) Int. Cl.
*H04B 7/02* (2018.01)
*H04B 7/0408* (2017.01)
*H04B 7/10* (2017.01)
*H04W 72/044* (2023.01)

(52) U.S. Cl.
CPC ............ *H04B 7/0408* (2013.01); *H04B 7/10* (2013.01); *H04W 72/046* (2013.01)

(58) Field of Classification Search
CPC ...... H04B 7/0408; H04B 7/10; H04W 72/046
USPC ................ 375/267, 260, 259, 219, 295, 316
See application file for complete search history.

(56) References Cited

U.S. PATENT DOCUMENTS

| 2017/0244467 A1 | 8/2017 | Cho et al. |
| 2019/0053286 A1* | 2/2019 | Cho ..................... H04B 7/0617 |

FOREIGN PATENT DOCUMENTS

| KR | 1020150137612 | 12/2015 |
| KR | 1020170041115 | 4/2017 |
| WO | 2020032862 | 2/2020 |
| WO | 2020259838 | 12/2020 |

OTHER PUBLICATIONS

PCT International Application No. PCT/KR2021/012147, International Search Report dated May 26, 2022, 3 pages.

* cited by examiner

*Primary Examiner* — Zewdu A Kassa
(74) *Attorney, Agent, or Firm* — LEE, HONG, DEGERMAN, KANG & WAIMEY

(57) ABSTRACT

A method performed by a first wireless device in a wireless communication system, according to one embodiment of the present specification, comprises the steps of: transmitting, to a second wireless device, a signal to which a specific beam is applied; receiving, from the second wireless device, feedback information generated on the basis of the signal; and determining, on the basis of the feedback information, a beam related to the second wireless device.

13 Claims, 31 Drawing Sheets

[FIG. 1]
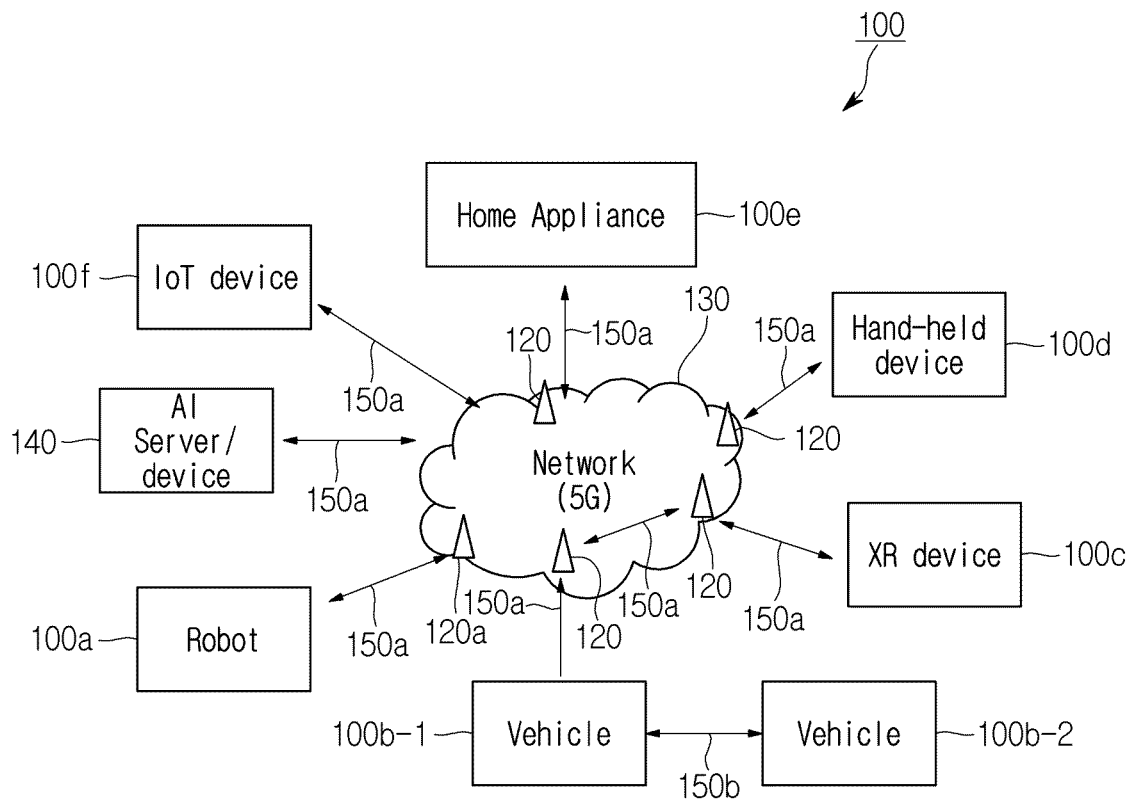
[FIG. 2]
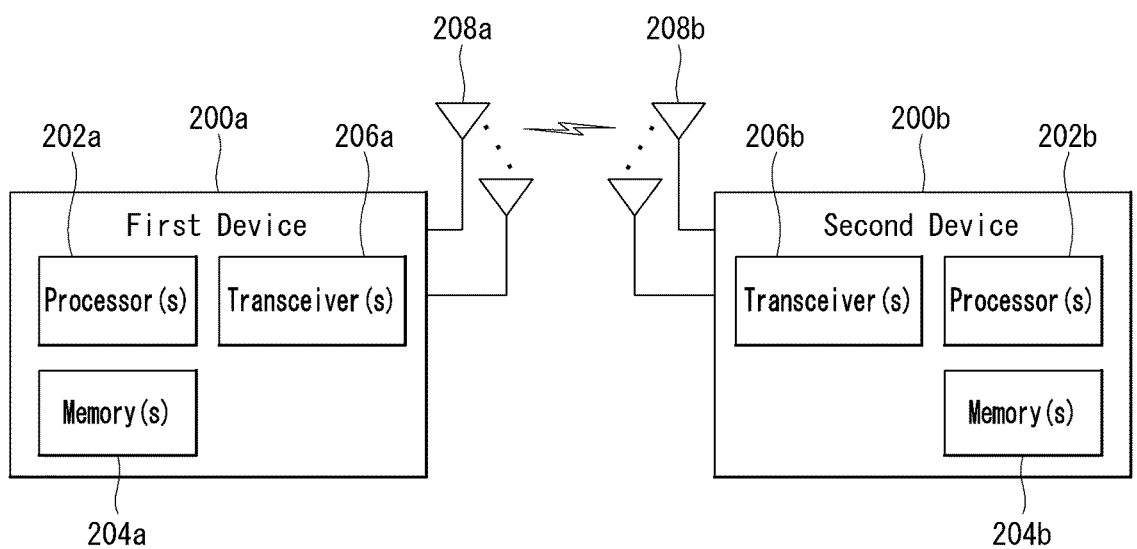

[FIG. 3]
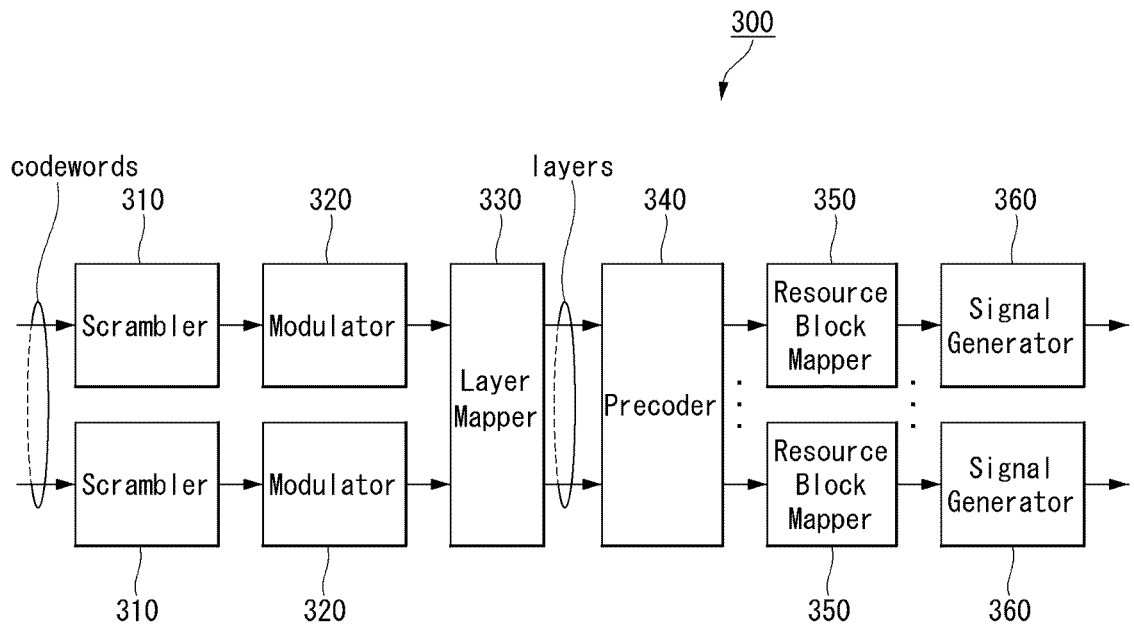
[FIG. 4]
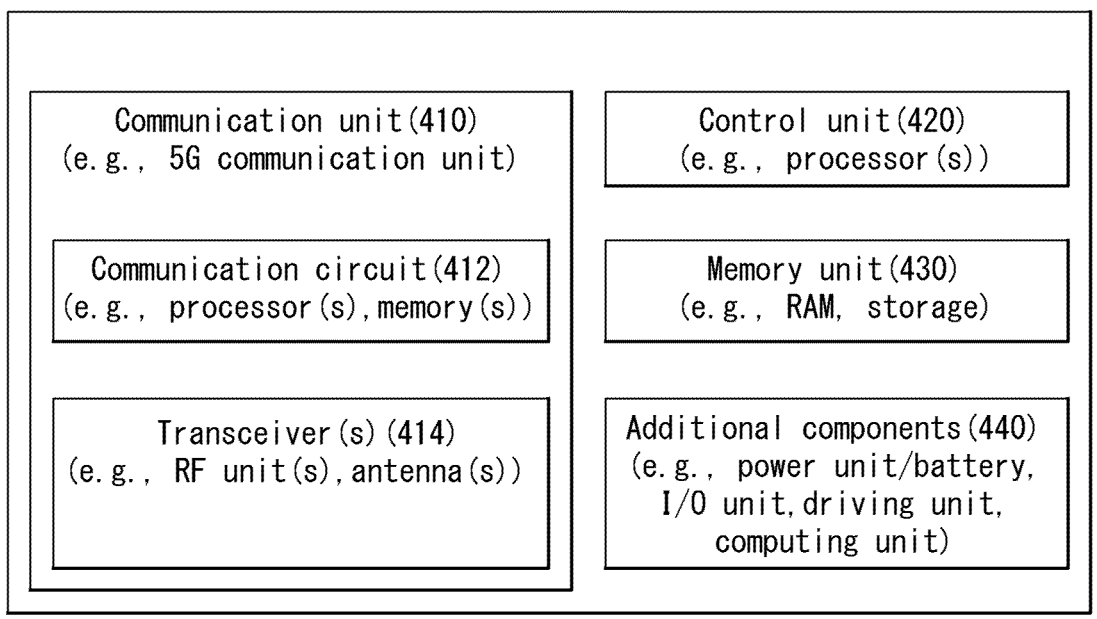

[FIG. 5]
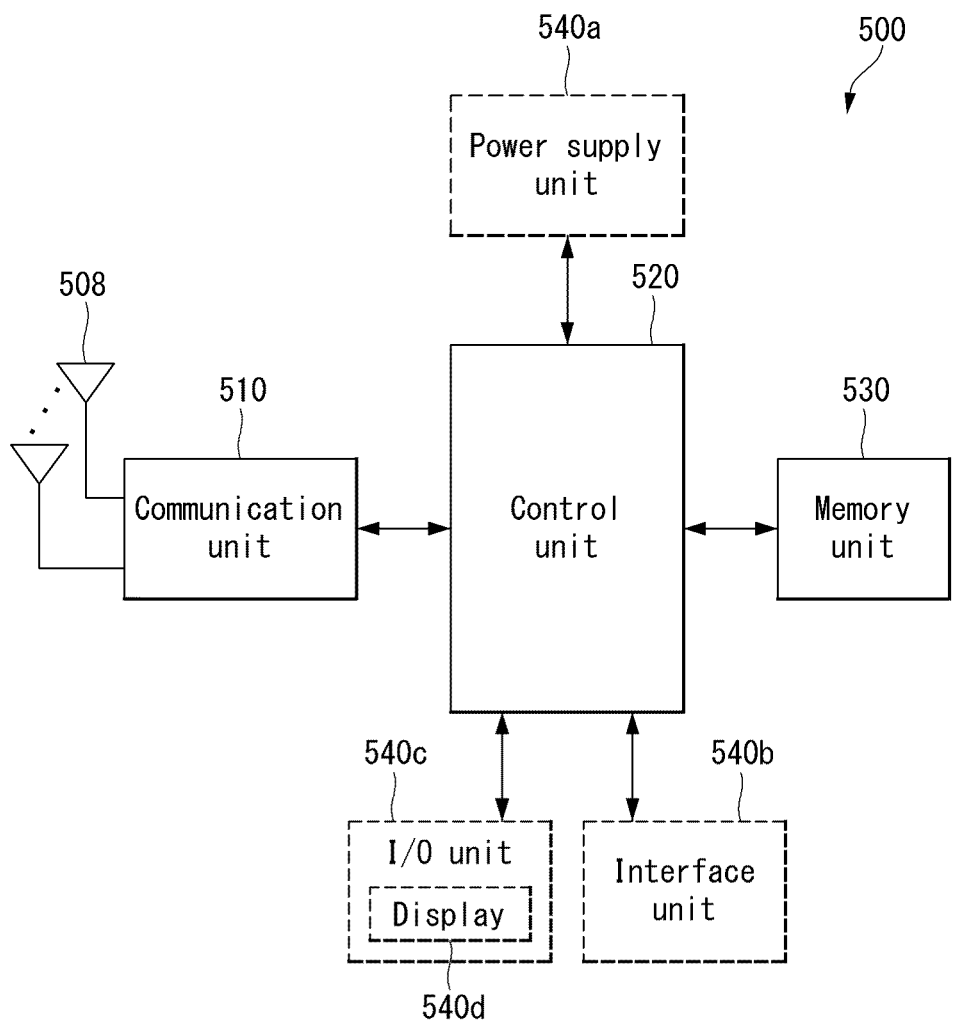

[FIG. 6]
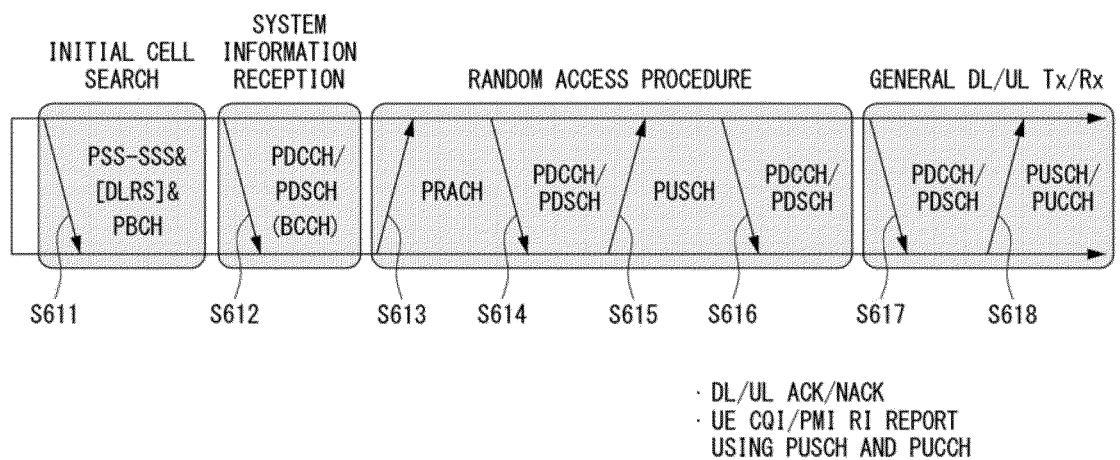
[FIG. 7]
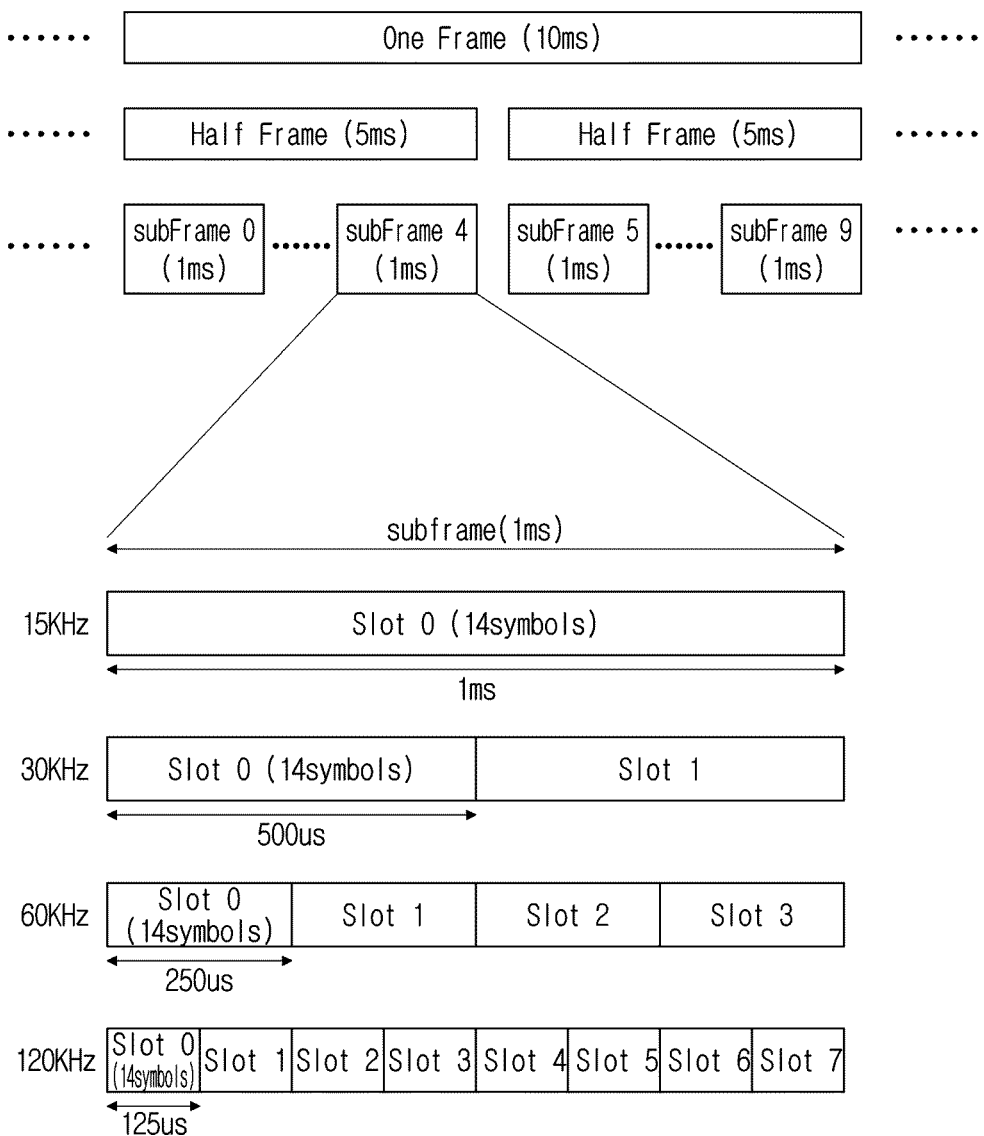

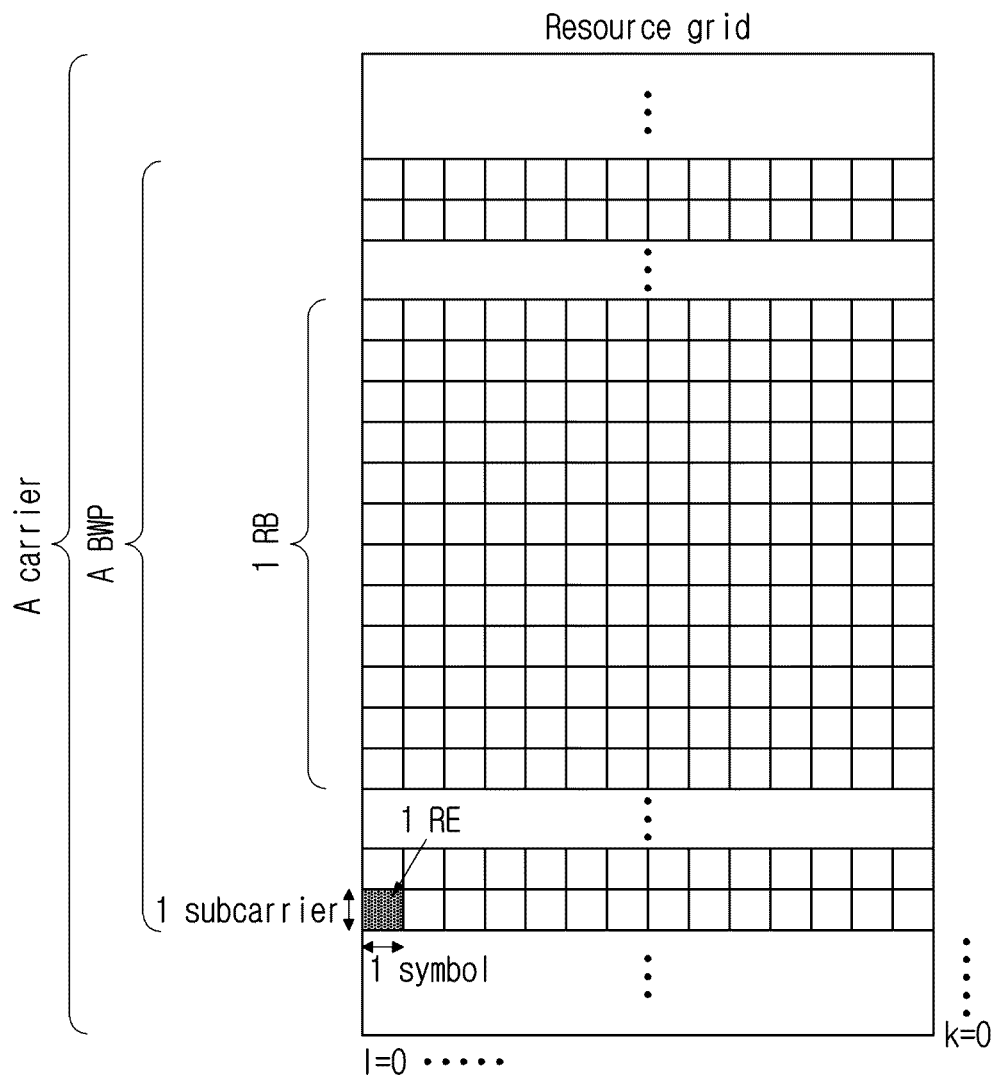
[FIG. 8]

【FIG. 9】
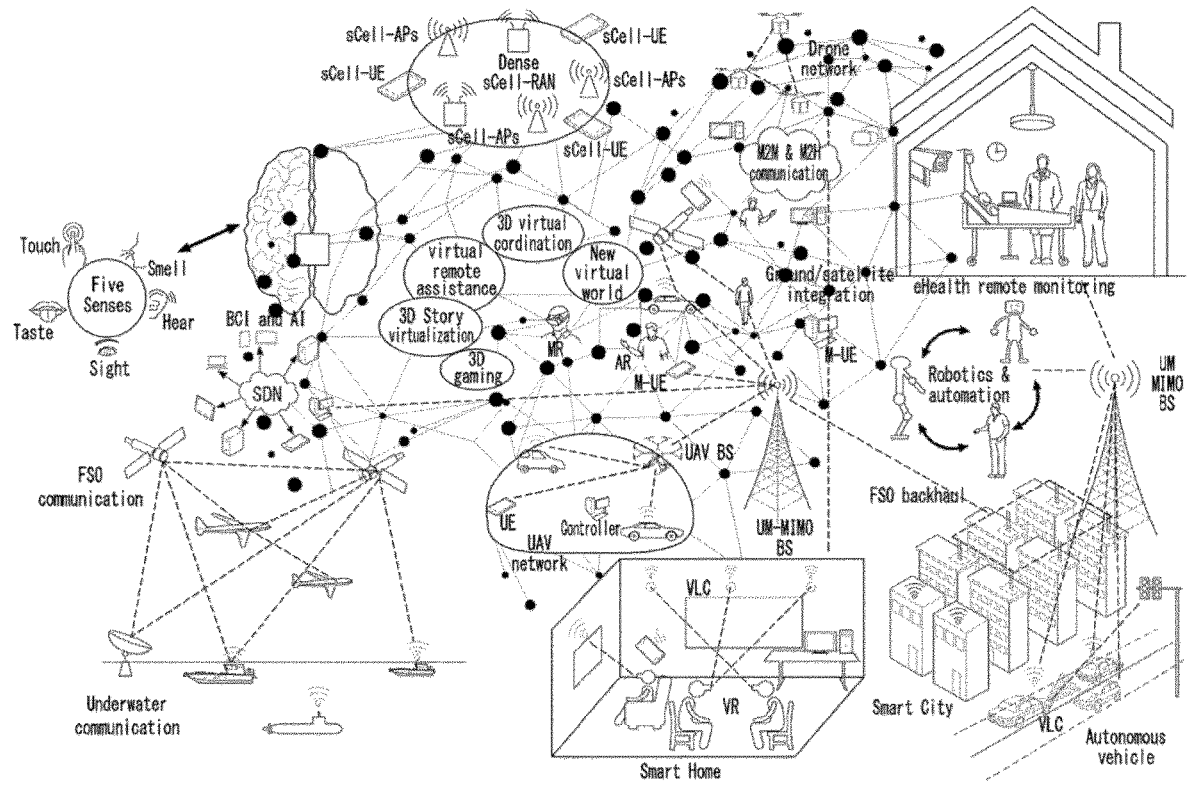
【FIG. 10】
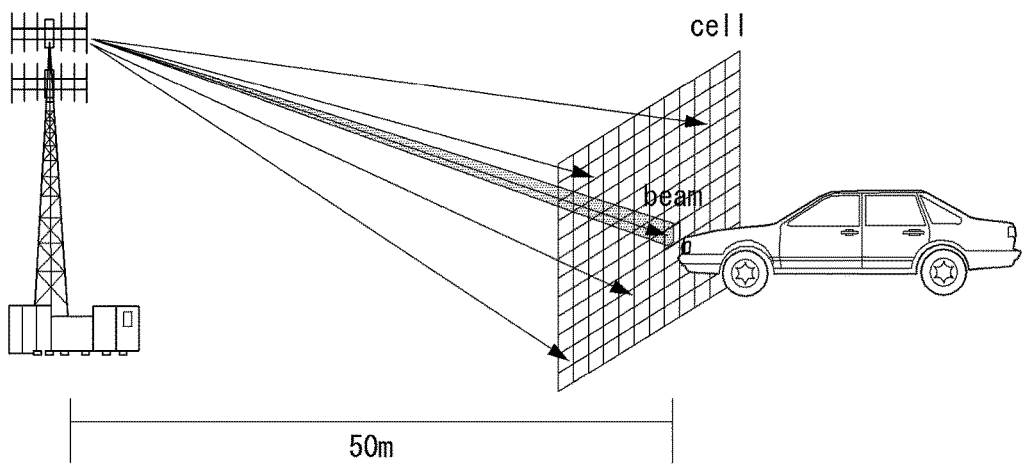

[FIG. 11]
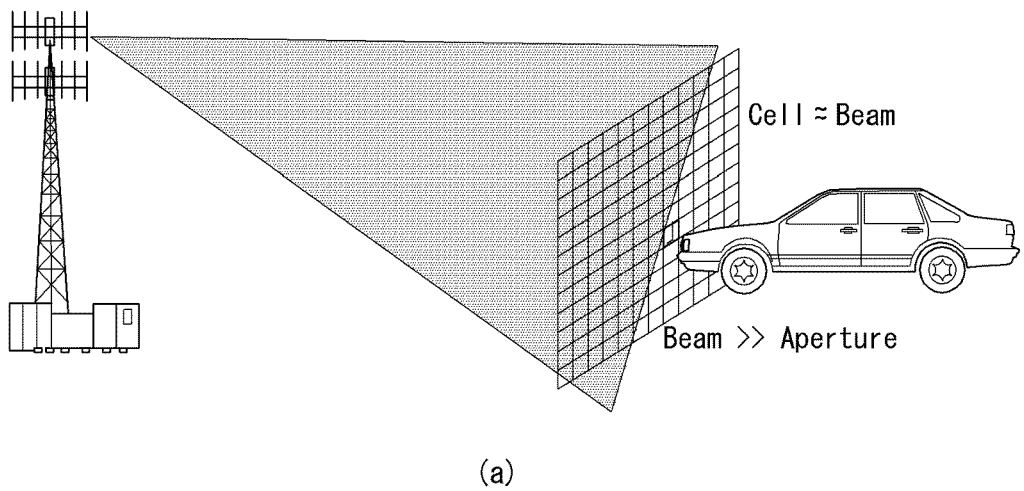
(a)
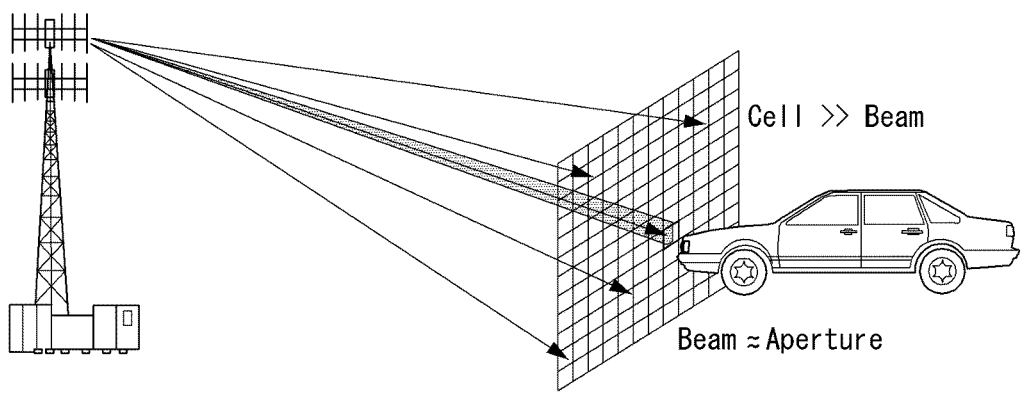
(b)

[FIG. 12]
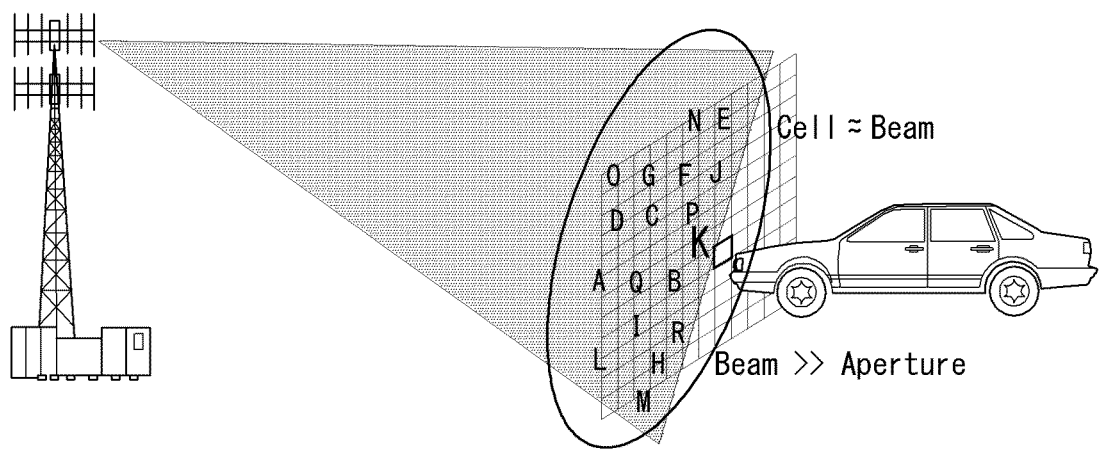
[FIG. 13]
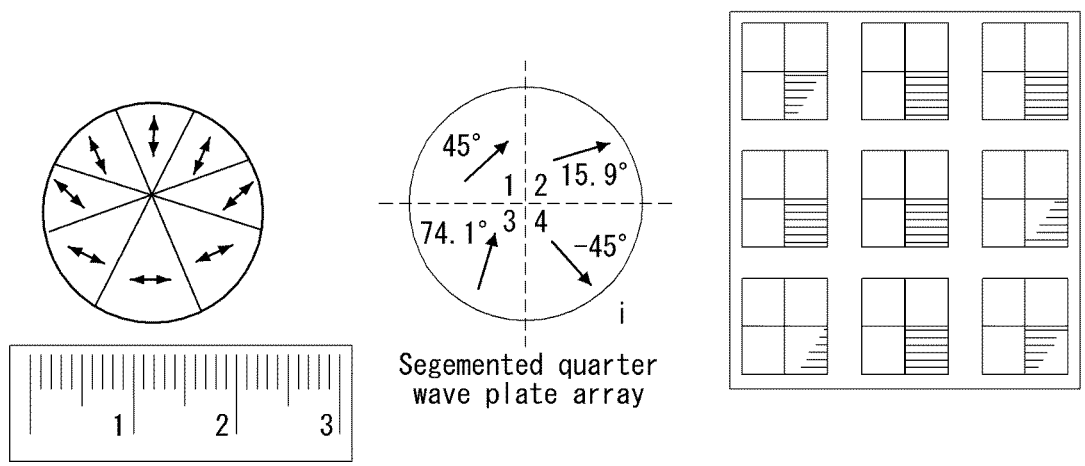
Segemented quarter
wave plate array

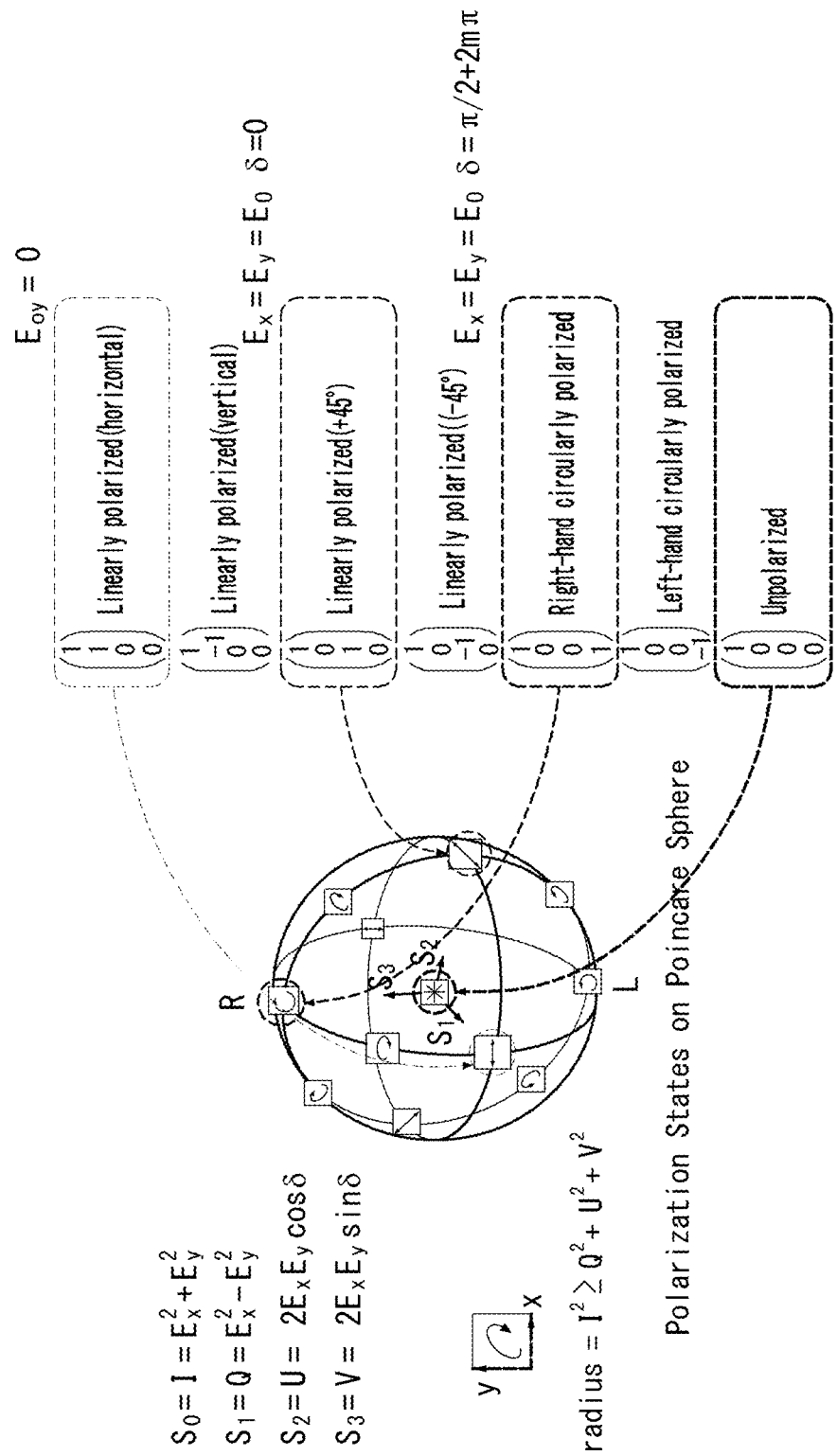
[FIG. 14]

[FIG. 15]
I:Total Intensity, $0 \leq p \leq 1$ : Degree of Polarization
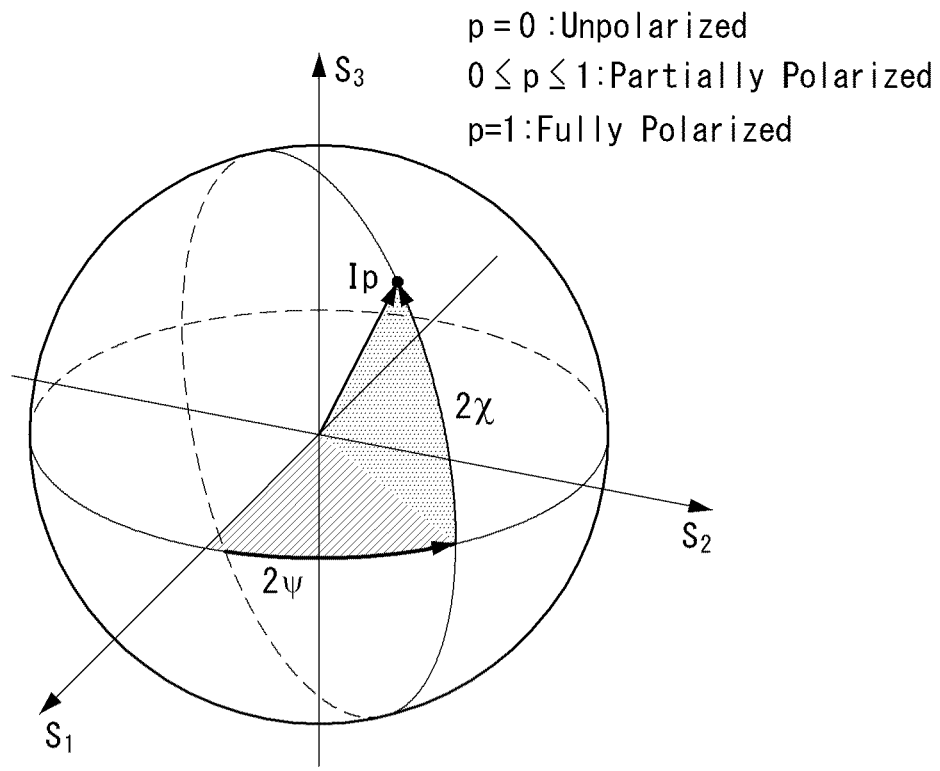
$p = 0$ :Unpolarized
$0 \leq p \leq 1$ :Partially Polarized
$p=1$ :Fully Polarized
Stokes Parameters in Spherical Coordinates
[FIG. 16]
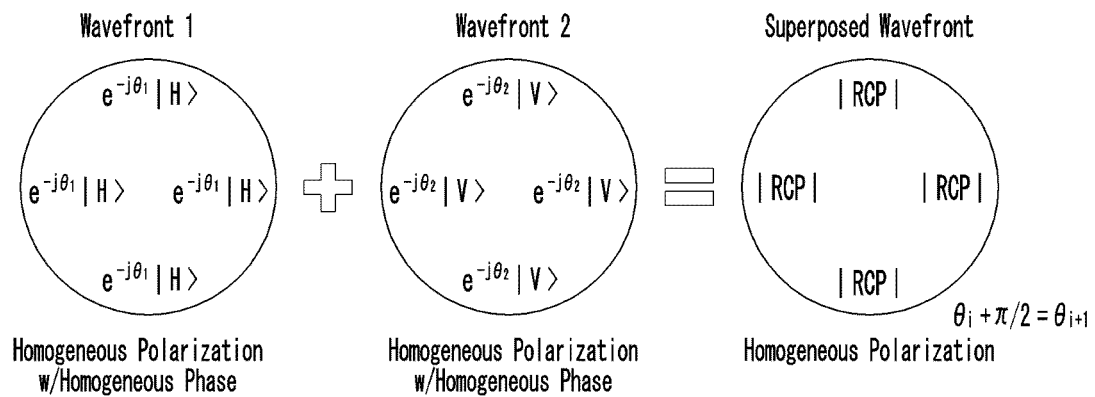

[FIG. 17]
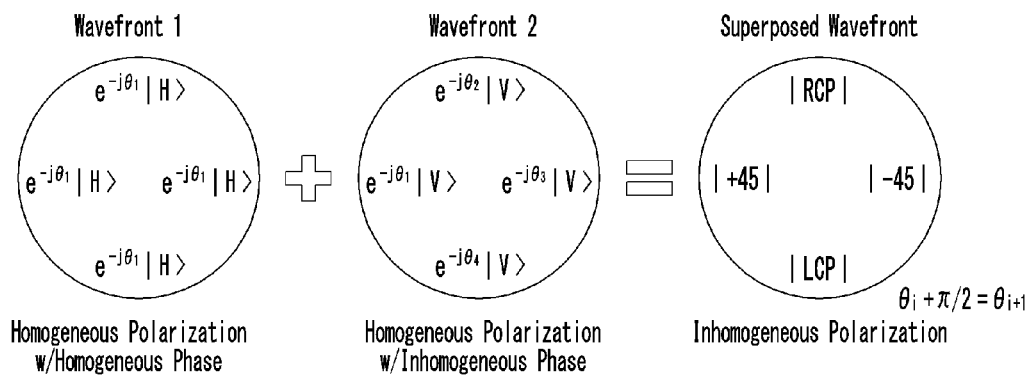
[FIG. 18]
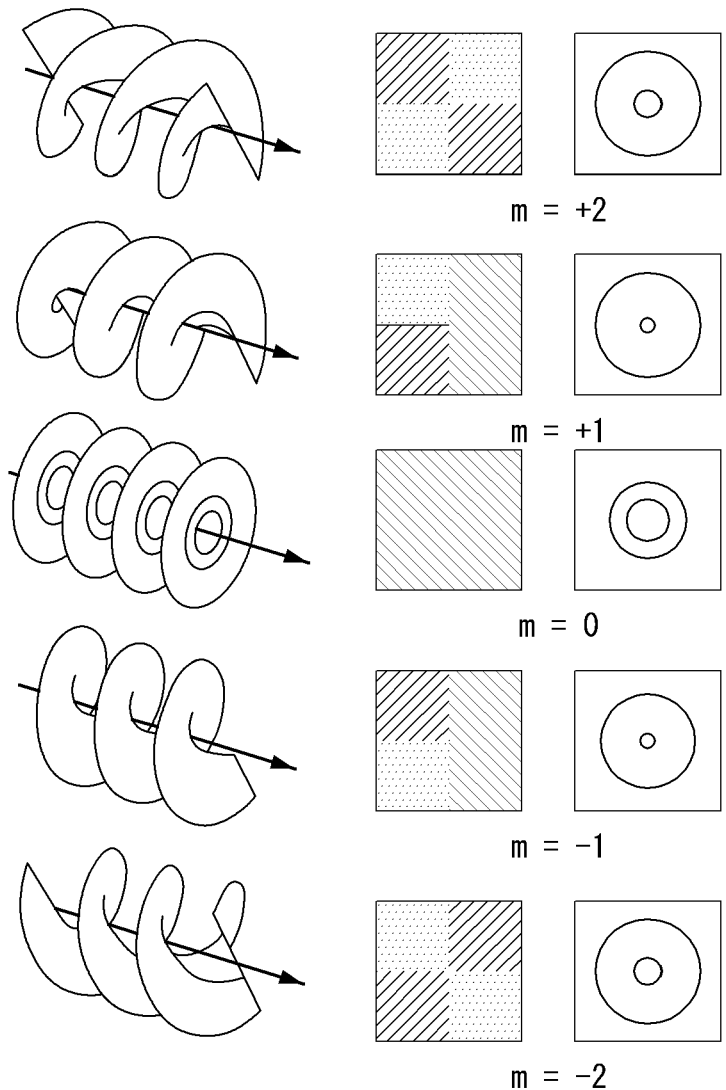

[FIG. 19]
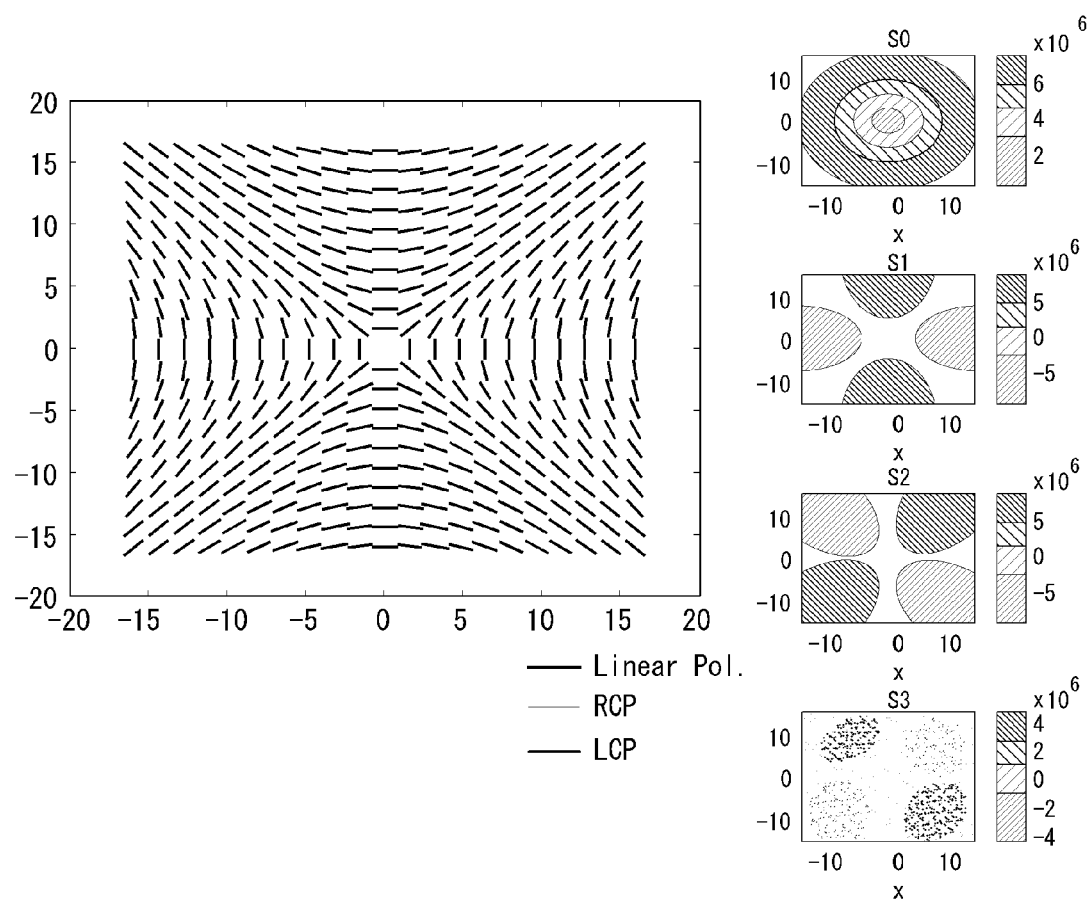

[FIG. 20]
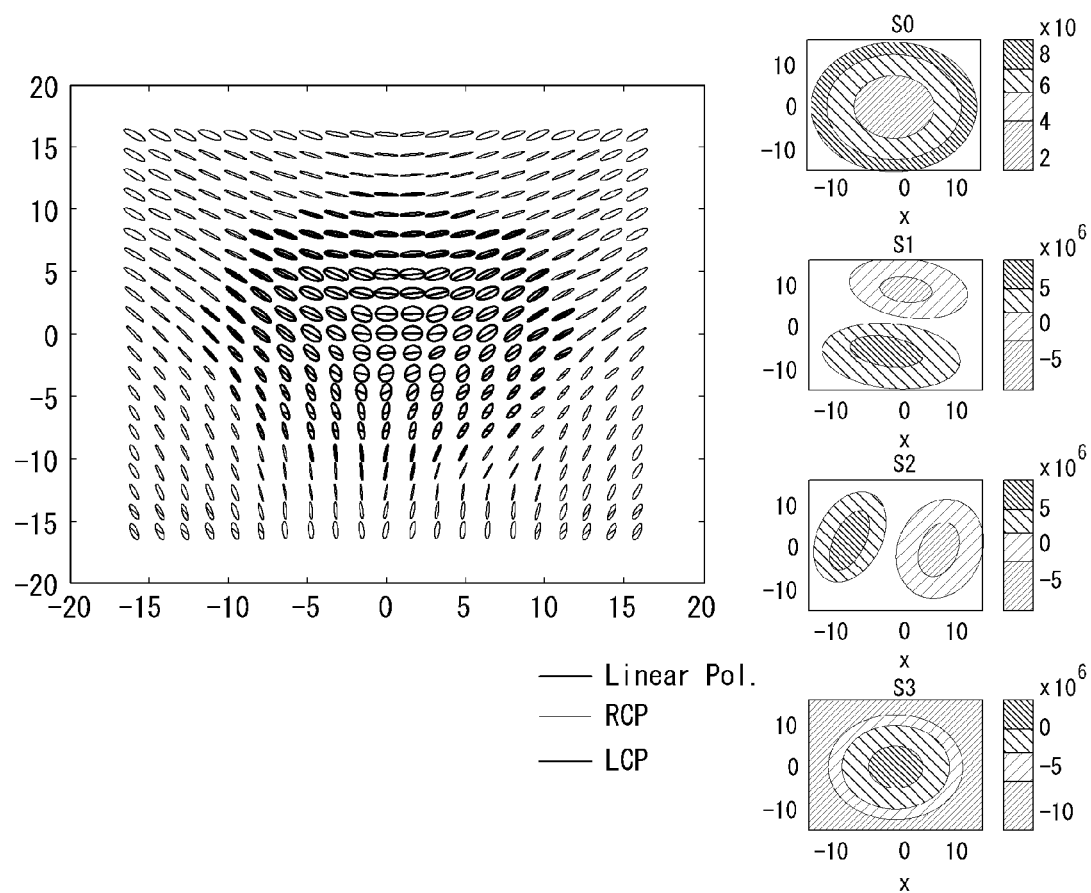

[FIG. 21]
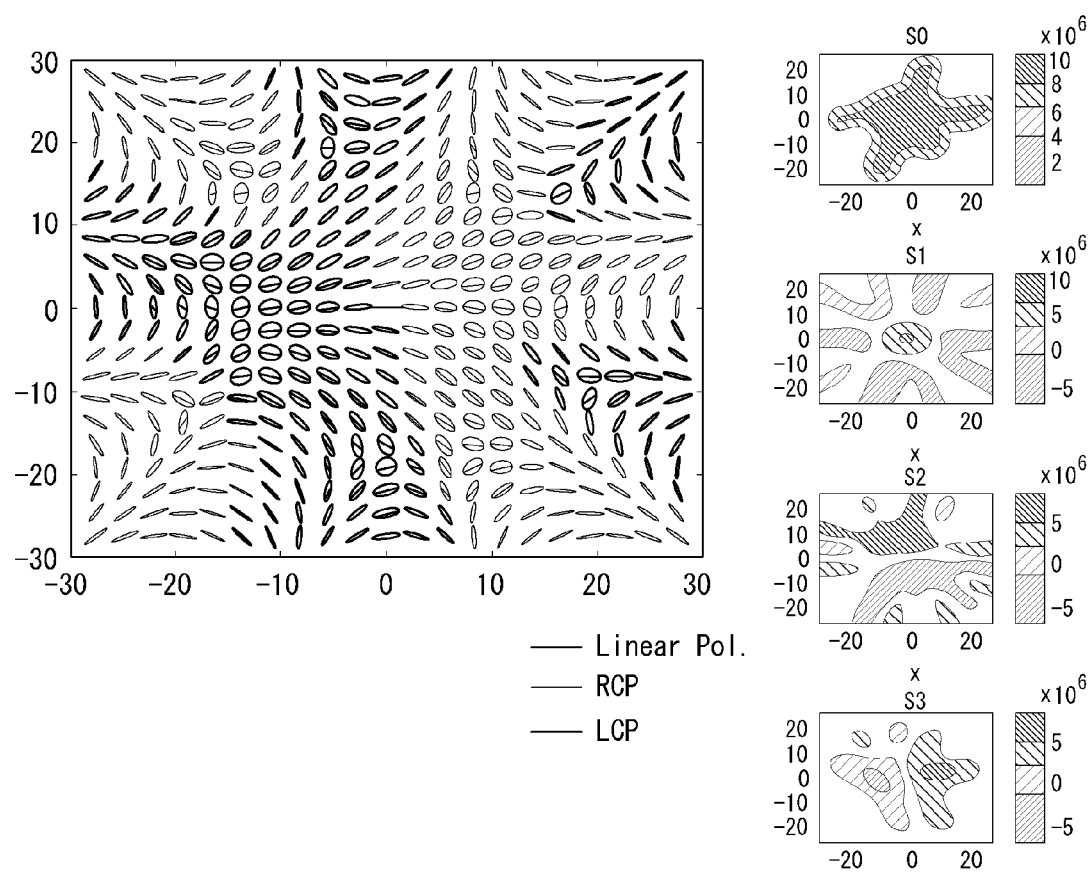

[FIG. 22]
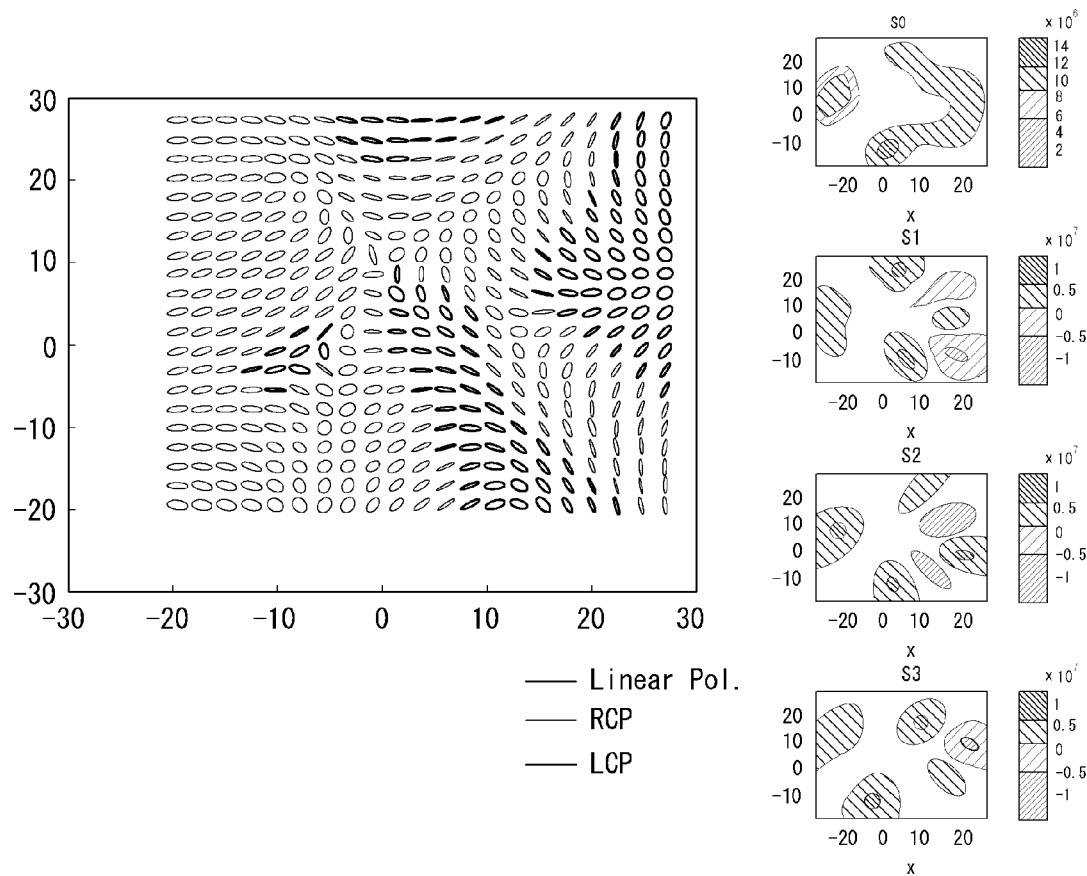
— Linear Pol.
— RCP
— LCP
[FIG. 23]
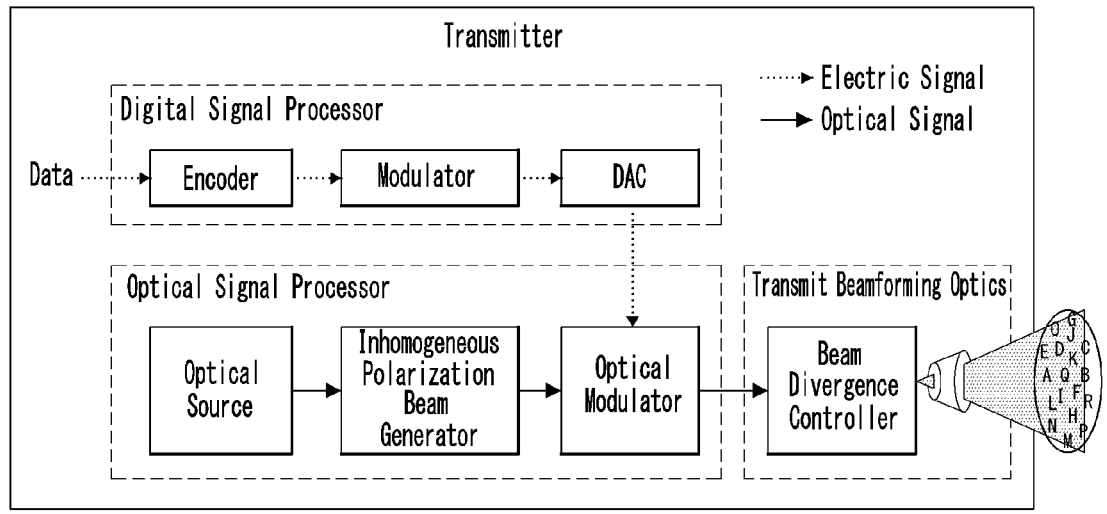

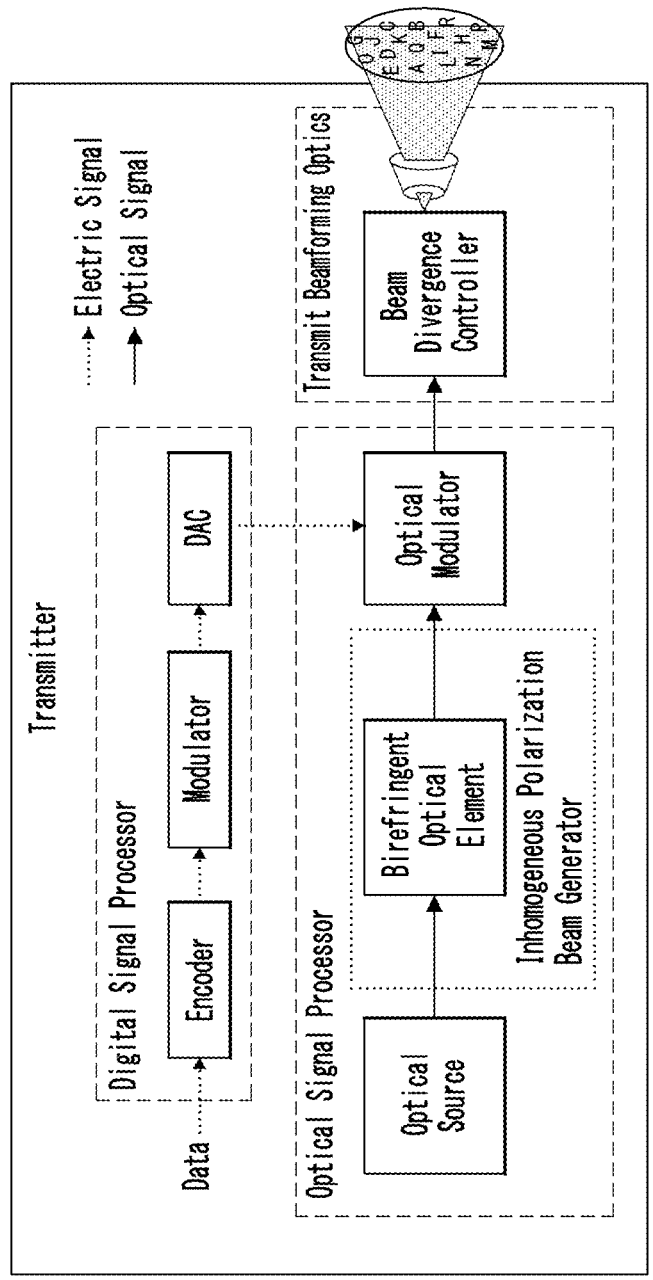
[FIG. 24]

[FIG. 25]
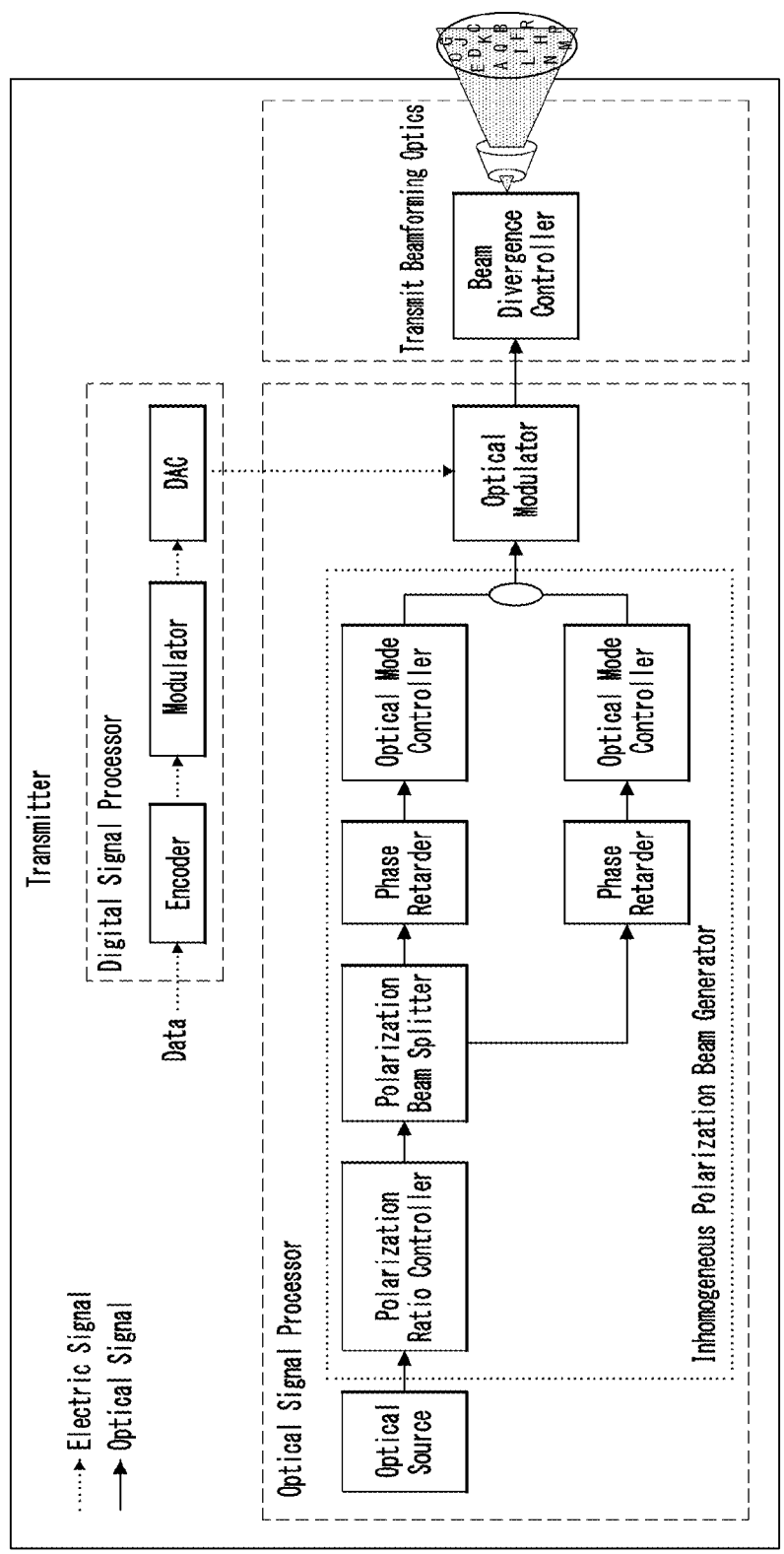

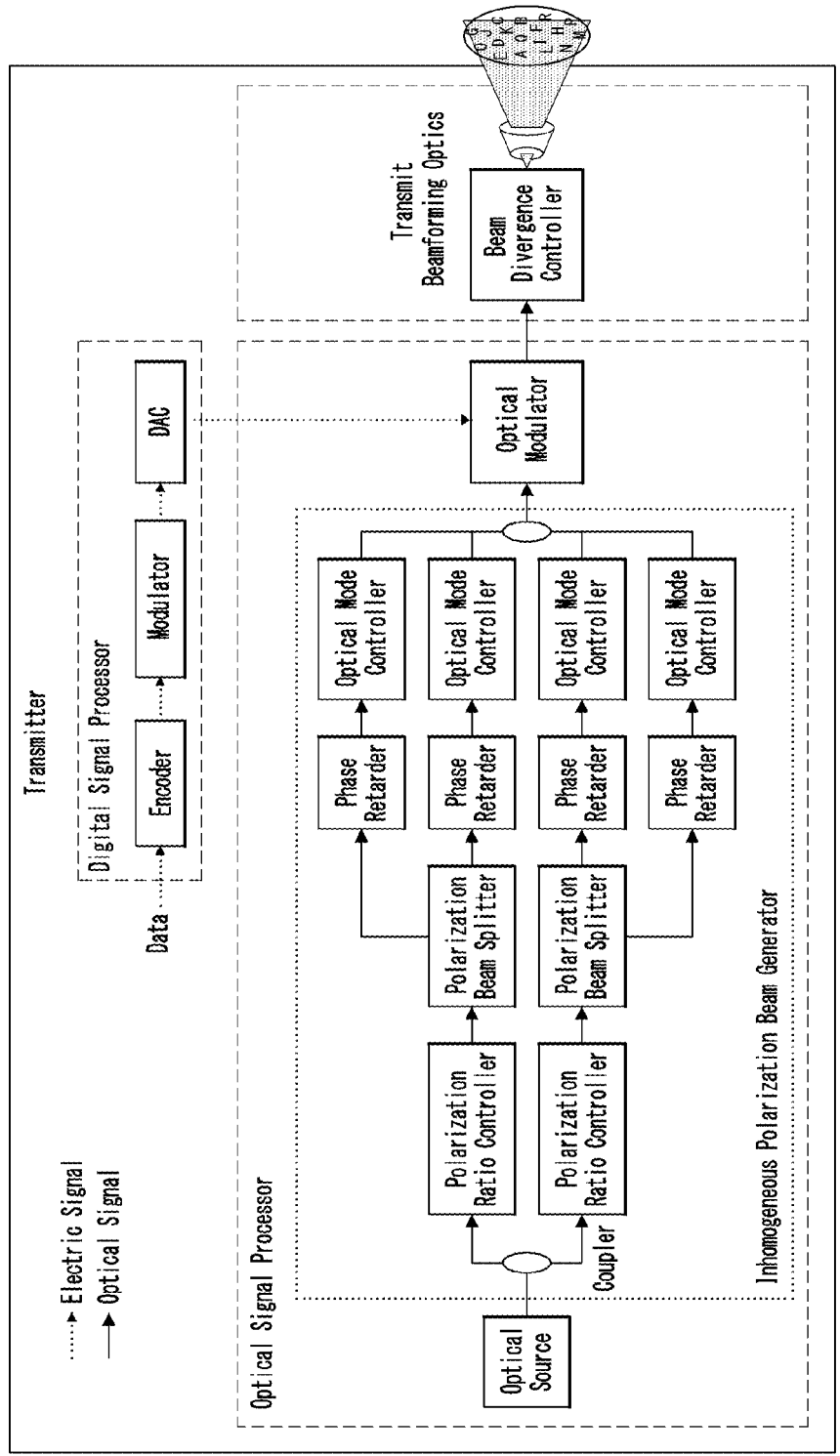
[FIG. 26]

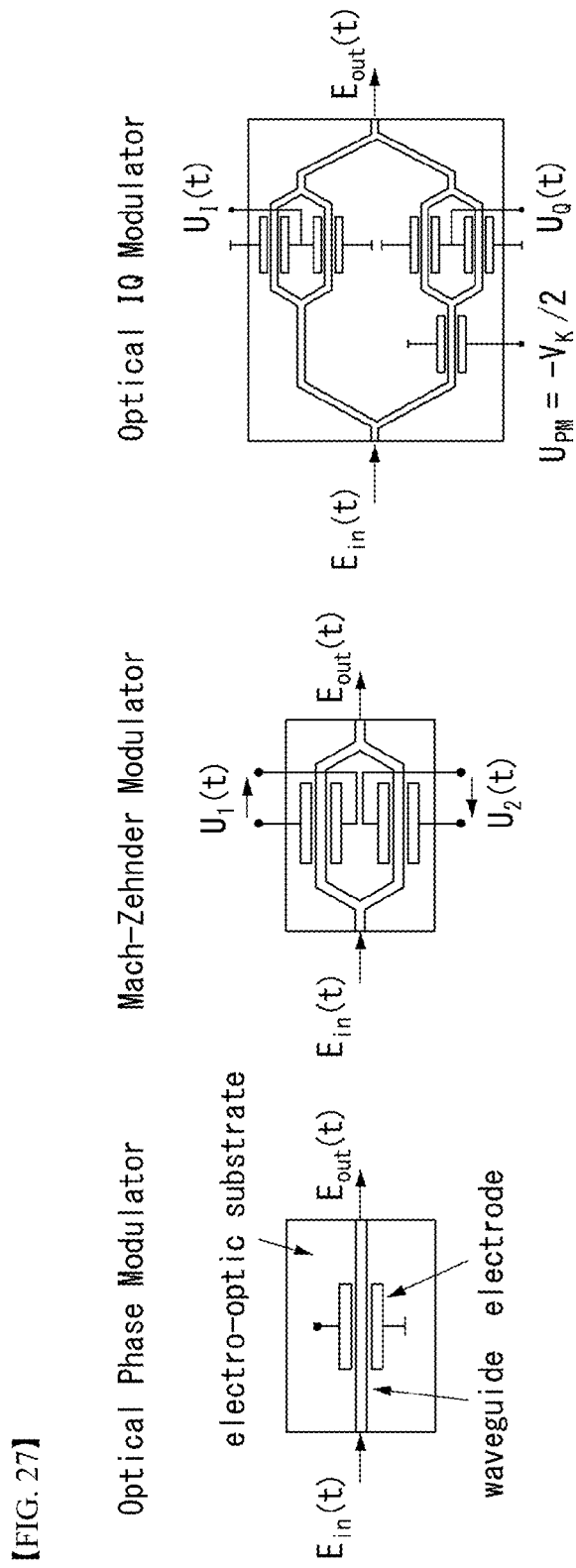
[FIG. 27]

[FIG. 28]
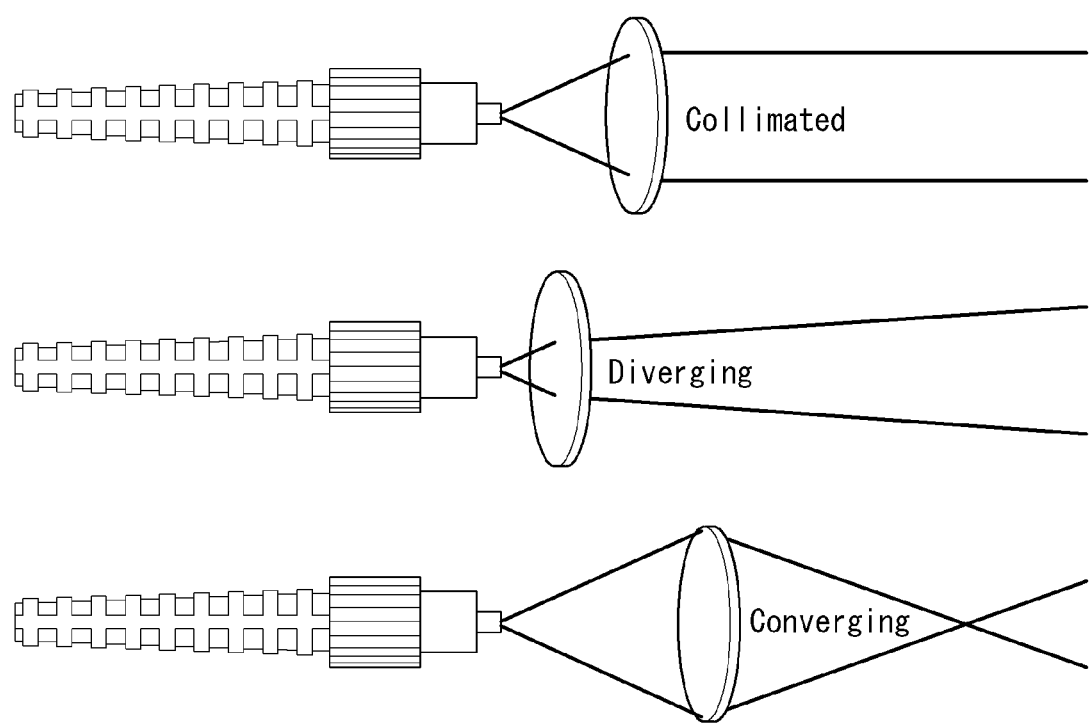

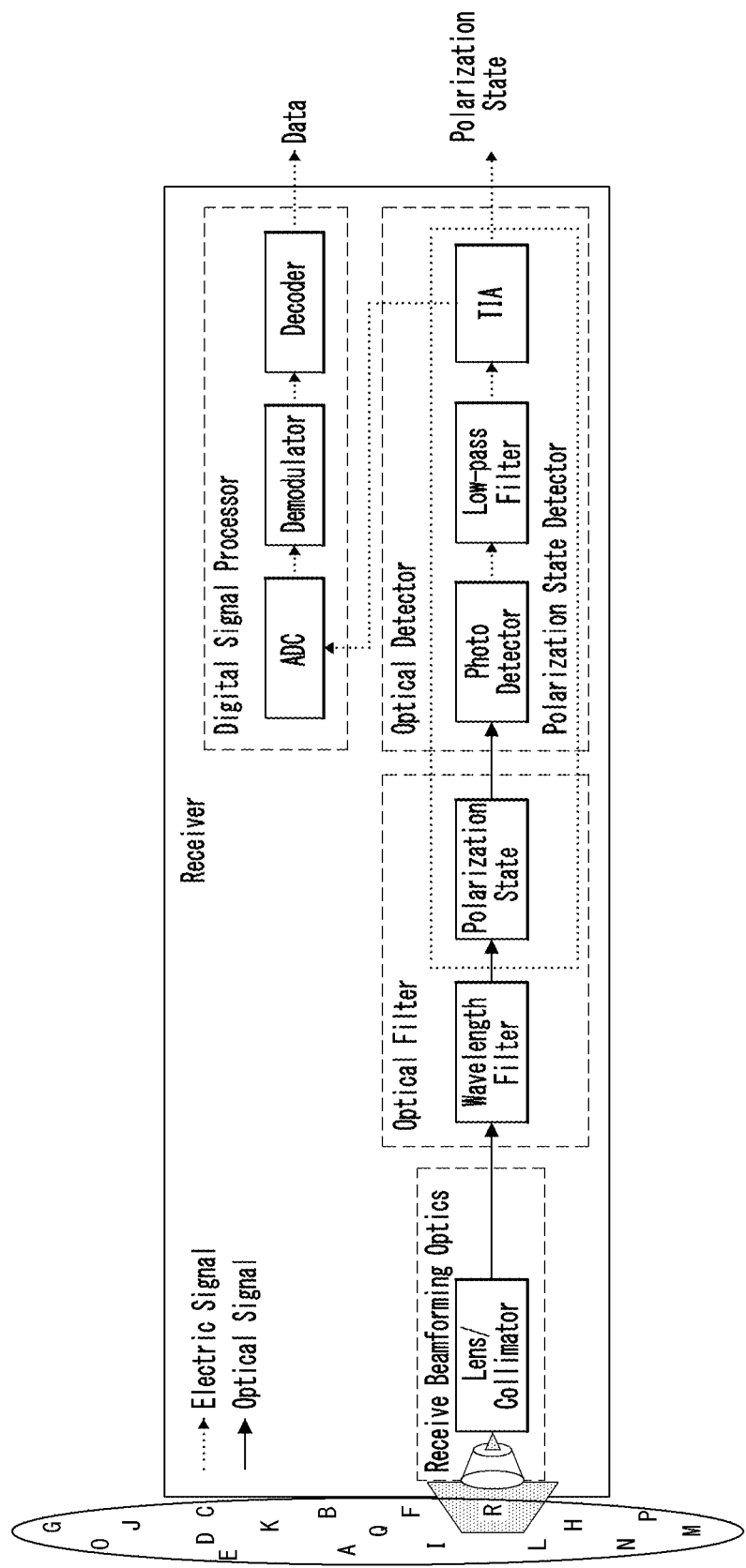
[FIG. 29]

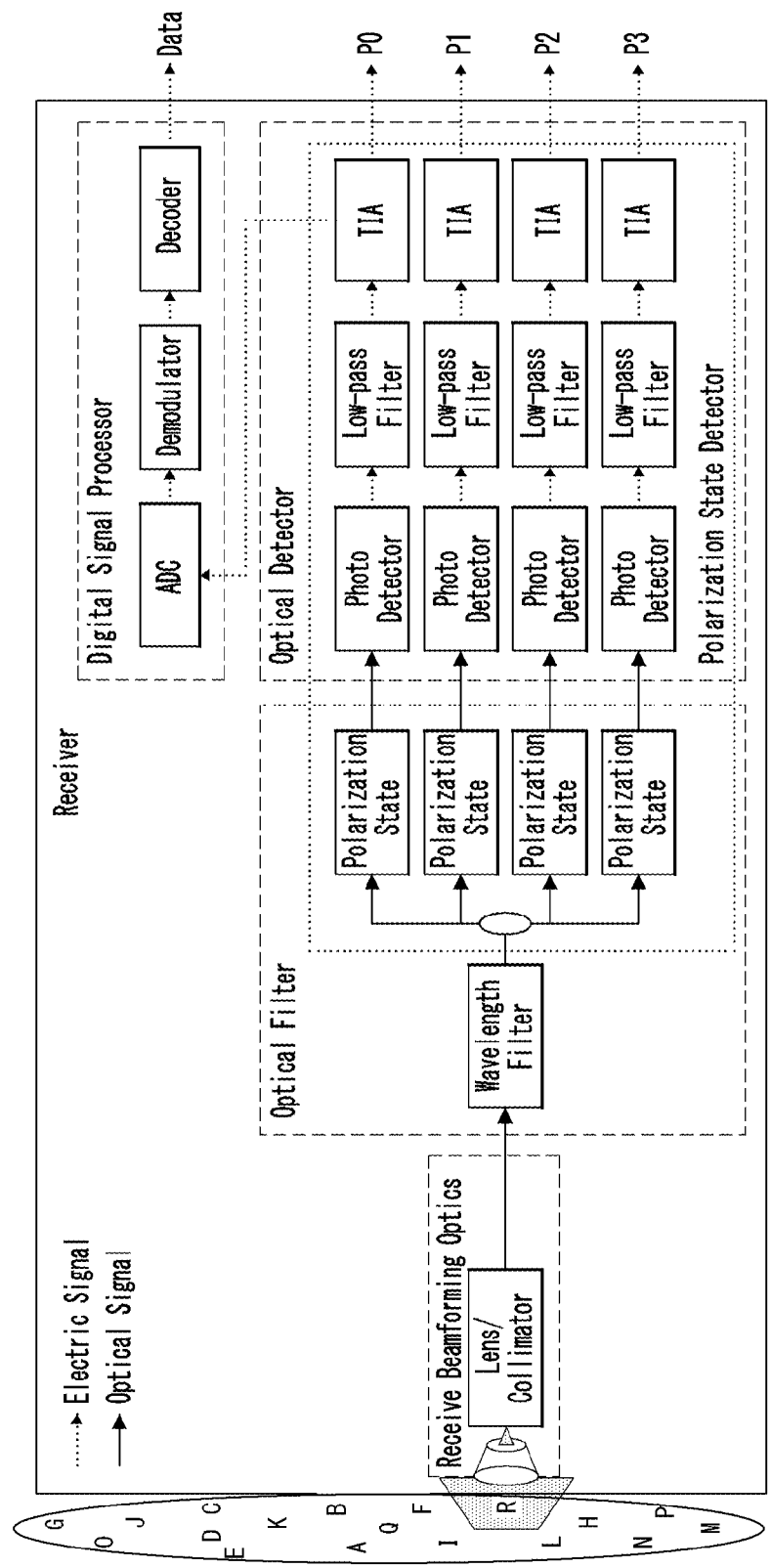
[FIG. 30]

[FIG. 31]
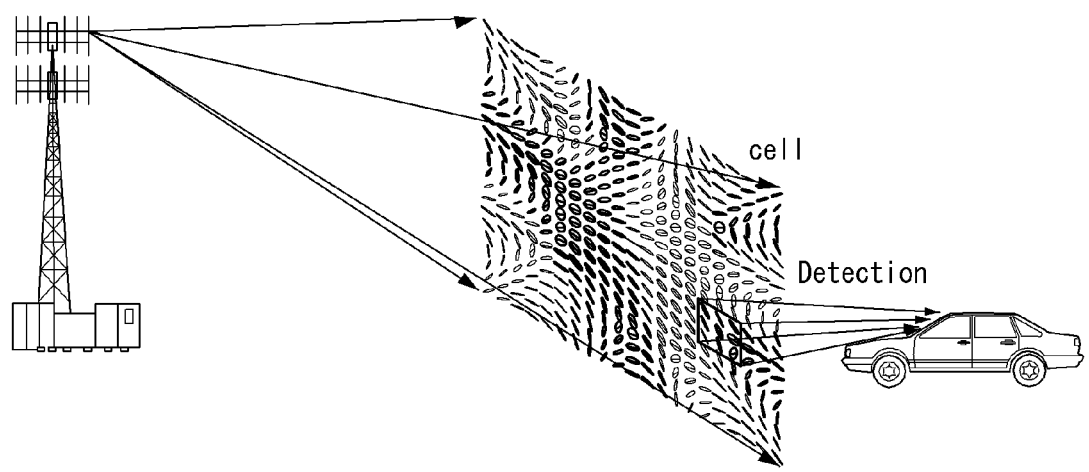

[FIG. 32]
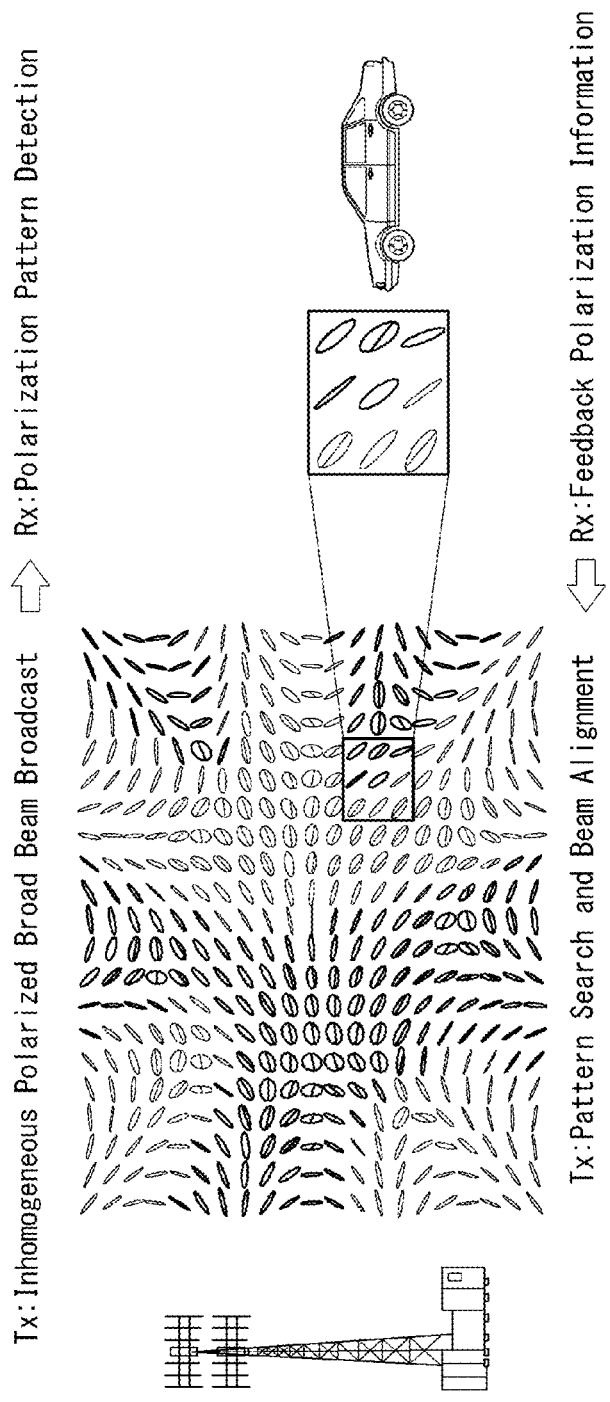

[FIG. 33]
Single Detection Point
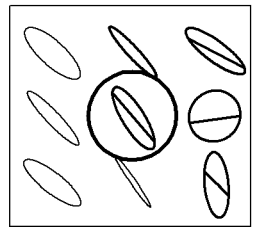
Decided by Single
Aperture Size
4 Points
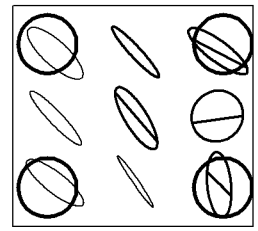
9 Points
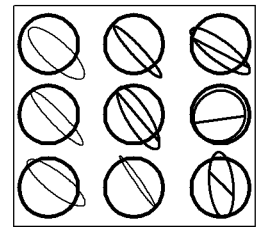
Decided by Quantized Single
Aperture or Multipel Apertures

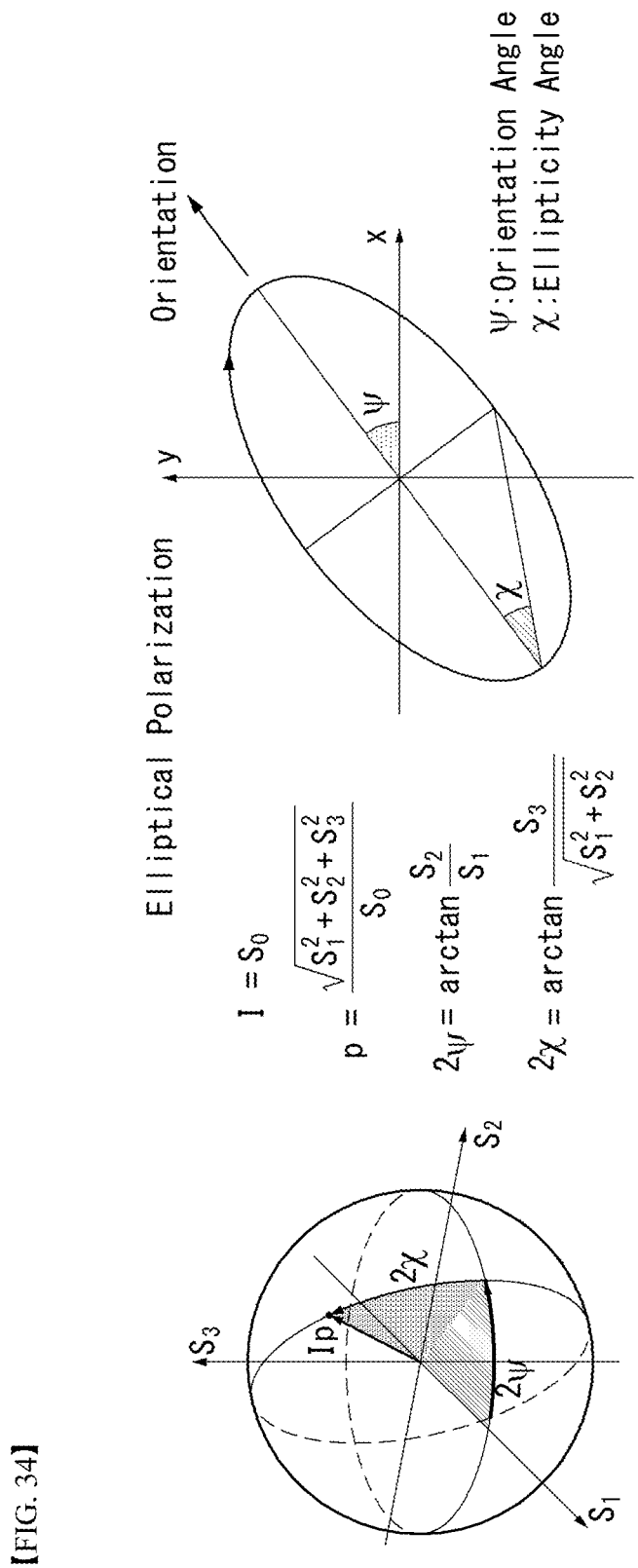
[FIG. 34]

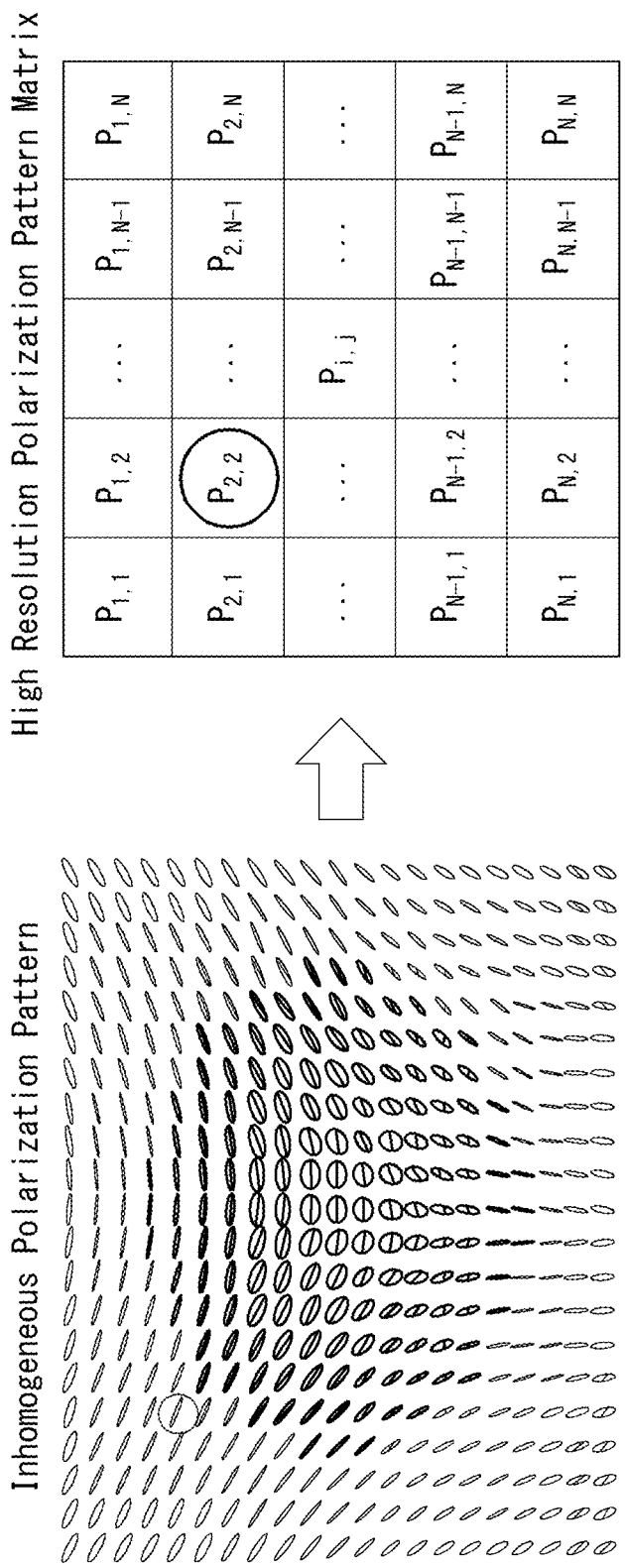
[FIG. 35]

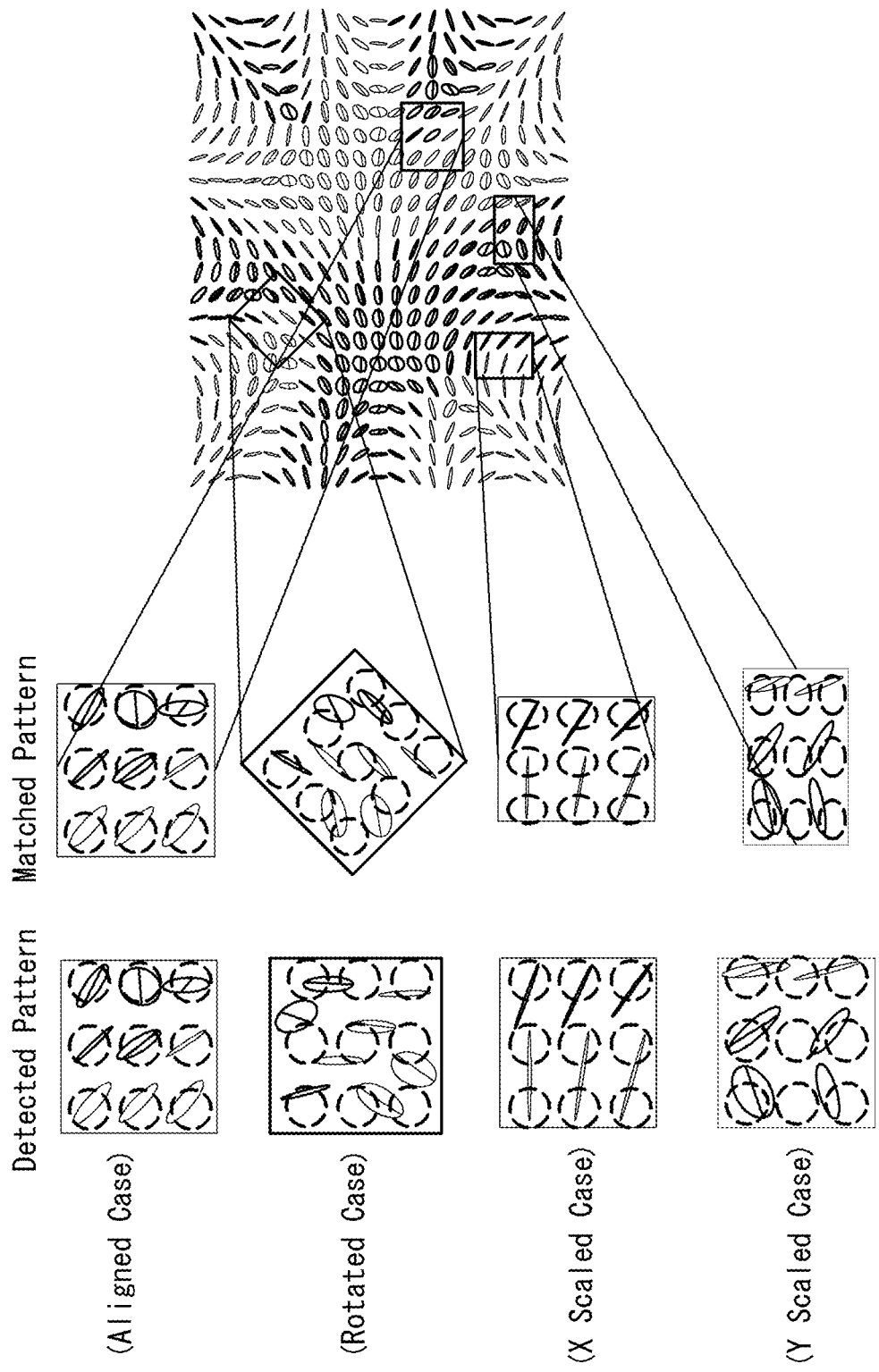
[FIG. 36]

[FIG. 37]
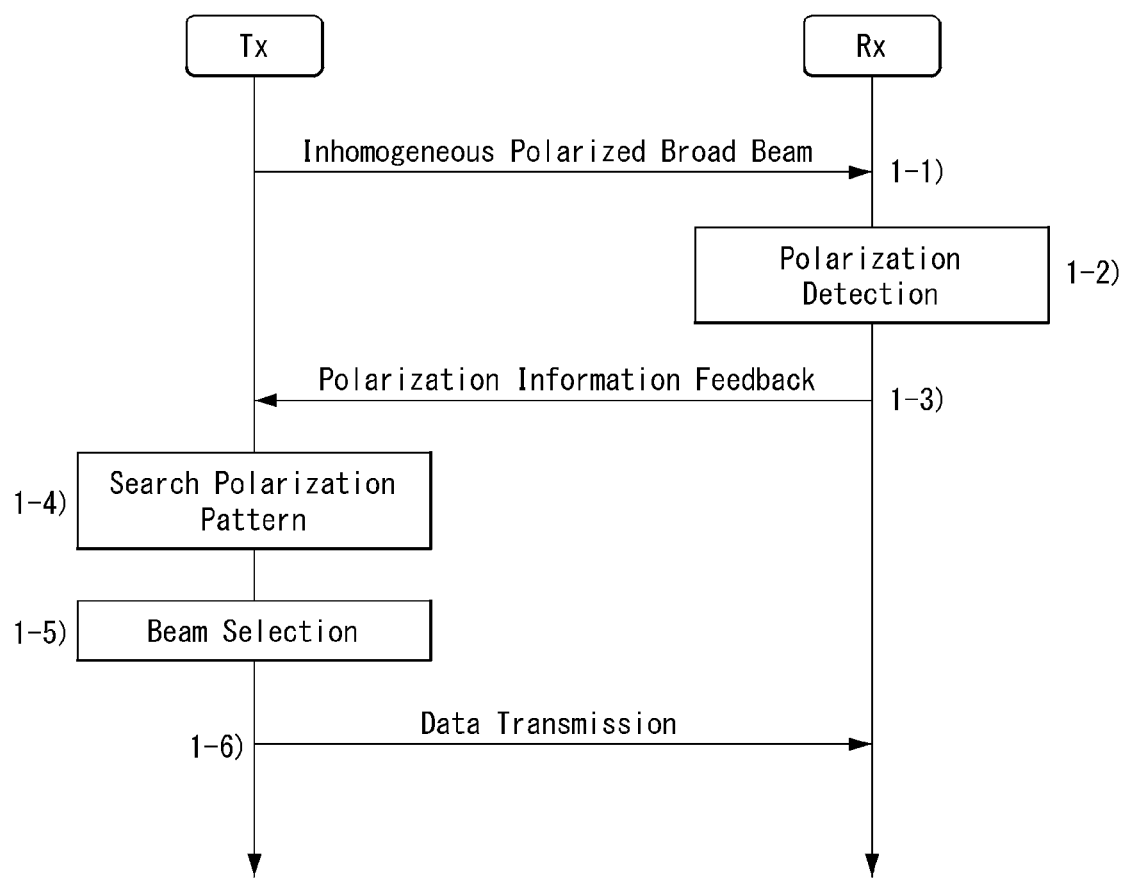

[FIG. 38]
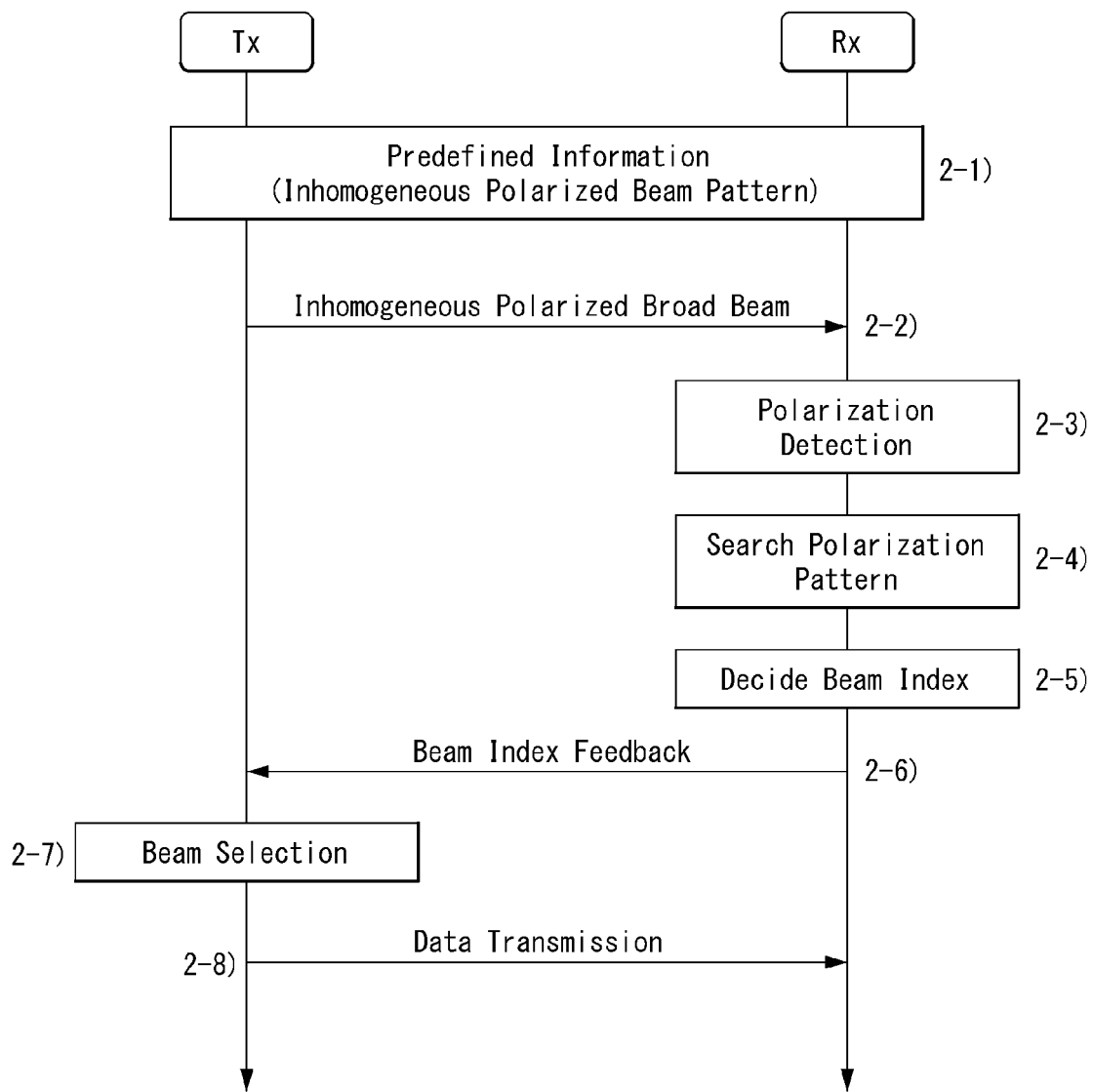

[FIG. 39]
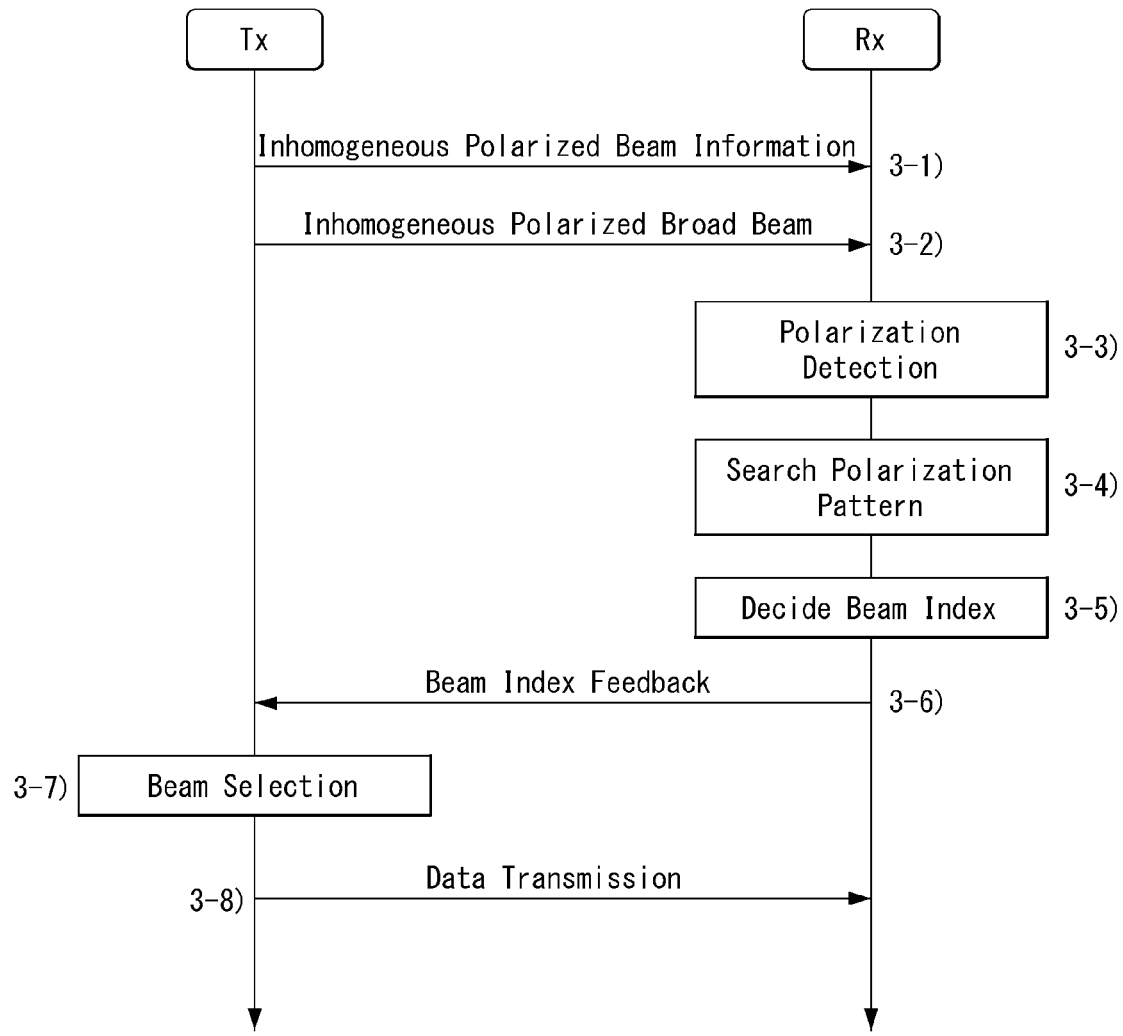
[FIG. 40]
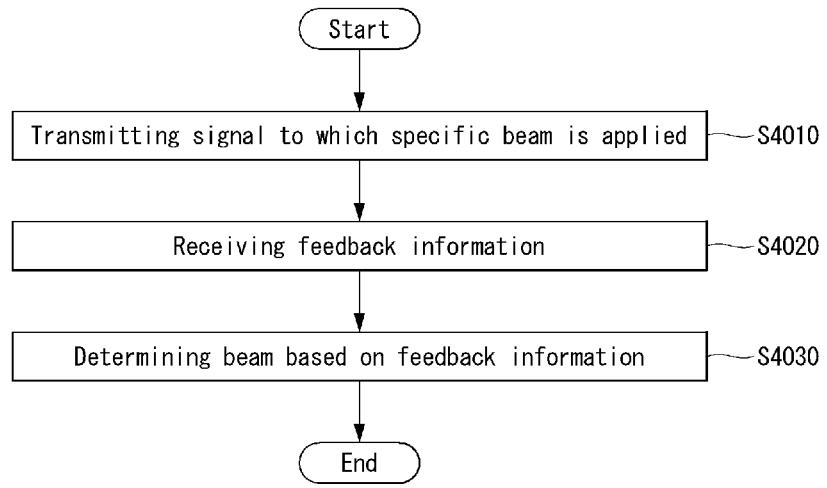

METHOD FOR CONTROLLING BEAM IN WIRELESS COMMUNICATION SYSTEM, AND APPARATUS THEREFOR

CROSS-REFERENCE TO RELATED APPLICATION(S)

This application is the National Stage filing under 35 U.S.C. 371 of International Application No. PCT/KR2021/012147, filed on Sep. 7, 2021, the contents of which are all incorporated by reference herein in its entirety.

TECHNICAL FIELD

The present disclosure relates to a method for controlling a beam in a wireless communication system, and an apparatus therefor.

BACKGROUND

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high-speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

SUMMARY

In systems that utilize pencil beams (e.g. 6G Terahertz Communication, etc.), a large number of beams (Tx/Rx Beams) exist within a single cell. Accordingly, the following problems arise with regard to beam alignment.

1) According to the beam alignment method using the index of the synchronization signal block (SSB), time resources (e.g. symbols) equal to the number of beams must be utilized, so there are disadvantages in terms of resource utilization, and the time required for beam alignment increases excessively.

2) The Multi-stage Beam Search method, which is performed in the order of broad beam to narrow beam, causes delay due to hand shaking between the transmitting side (Tx) and the receiving side (Rx).

The purpose of the present disclosure is to propose a method to solve the problems 1) and 2) above. Specifically, the present disclosure proposes a method of aligning a beam based on an optical beam including inhomogeneous information/heterogeneous information.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

A method performed by a first wireless device in a wireless communication system according to an embodiment of the present disclosure comprises transmitting a signal to which a specific beam is applied to a second wireless device, receiving feedback information generated based on the signal from the second wireless device, and determining a beam related to the second wireless device based on the feedback information.

The signal to which the specific beam is applied is based on one optical beam including inhomogeneous information.

The inhomogeneous information includes a plurality of polarization states generated based on a birefringent element or a polarization superposition.

The feedback information represents one or more specific polarization states among the plurality of polarization states.

The beam related to the second wireless device is determined based on a beam index mapped to the one or more specific polarization states.

The plurality of polarization states may be based on an inhomogeneous polarization pattern matrix.

The beam index mapped to the one or more specific polarization states may be determined based on one or more specific elements related to the one or more specific polarization states among elements of the inhomogeneous polarization pattern matrix.

The inhomogeneous polarization pattern matrix may be based on preconfigured polarization information. The preconfigured polarization information may include i) information representing the inhomogeneous polarization pattern matrix, or ii) information representing a beam combination that generates the inhomogeneous polarization pattern matrix.

Based on the preconfigured polarization information being included in a specific information block broadcast by the first wireless device, the feedback information may include the beam index mapped to the one or more specific polarization states.

The determining a beam related to the second wireless device may include calculating a degree of similarity between each element of the inhomogeneous polarization pattern matrix and the one or more specific polarization states and determining an element most similar to the one or more specific polarization states among elements of the inhomogeneous polarization pattern matrix based on the calculated similarity.

The one optical beam including inhomogeneous information may be based on one broad beam formed to broadcast a signal to a certain area.

The one or more specific polarization states may be based on a polarization state detected by the second wireless device.

The polarization state detected by the second wireless device may vary depending on a location of the second wireless device within the certain area.

The polarization state detected by the second wireless device may be based on a stokes vector or a Poincare Sphere Angle Vector.

A first wireless device operating in a wireless communication system according to another embodiment of the present disclosure comprises one or more transceivers, one or more processors controlling the one or more transceivers, and one or more memories operably connected to the one or more processors, and storing instructions that configure the one or more processors to perform operations when being executed by the one or more processors.

The operations include transmitting a signal to which a specific beam is applied to a second wireless device, receiving feedback information generated based on the signal from the second wireless device, and determining a beam related to the second wireless device based on the feedback information.

The signal to which the specific beam is applied is based on one optical beam including inhomogeneous information.

The inhomogeneous information includes a plurality of polarization states generated based on a birefringent element or a polarization superposition.

The feedback information represents one or more specific polarization states among the plurality of polarization states.

The beam related to the second wireless device is determined based on a beam index mapped to the one or more specific polarization states.

The first wireless device may be a base station (BS), and the second wireless device may be a user equipment (UE).

An apparatus according to another embodiment of the present disclosure comprises one or more memories and one or more processors functionally connected to the one or more memories, wherein the one or more memories store instructions that configure the one or more processors to perform operations when being executed by the one or more processors.

The operations include transmitting a signal to which a specific beam is applied to a second wireless device, receiving feedback information generated based on the signal from the second wireless device, and determining a beam related to the second wireless device based on the feedback information.

The signal to which the specific beam is applied is based on one optical beam including inhomogeneous information.

The inhomogeneous information includes a plurality of polarization states generated based on a birefringent element or a polarization superposition.

The feedback information represents one or more specific polarization states among the plurality of polarization states.

The beam related to the second wireless device is determined based on a beam index mapped to the one or more specific polarization states.

One or more non-transitory computer-readable medium according to another embodiment of the present disclosure store one or more instructions. The one or more instructions configure the one or more processors to perform operations when being executed by the one or more processors.

The operations include transmitting a signal to which a specific beam is applied to a second wireless device, receiving feedback information generated based on the signal from the second wireless device, and determining a beam related to the second wireless device based on the feedback information.

The signal to which the specific beam is applied is based on one optical beam including inhomogeneous information.

The inhomogeneous information includes a plurality of polarization states generated based on a birefringent element or a polarization superposition.

The feedback information represents one or more specific polarization states among the plurality of polarization states.

The beam related to the second wireless device is determined based on a beam index mapped to the one or more specific polarization states.

According to the existing method for beam alignment/beam search, RS (SSB or CSI-RS) to which one beam is mapped must be transmitted using physical resources equal to the number of beams to cover the cell. Therefore, it is inefficient in terms of resource utilization and time required for beam alignment. Additionally, when a pencil beam is used, the number of beams further increases.

On the other hand, according to an embodiment of the present disclosure, beam alignment can be performed by transmitting a signal to which a specific beam covering the cell is applied. The signal to which the specific beam is applied may be based on one optical beam including inhomogeneous information. For the optical beam generated through the polarization superposition, different polarization information (e.g. polarization state) is detected depending on the position of the receiver that receives the beam. Specifically, feedback information generated based on a signal to which the specific beam is applied may indicate one or more specific polarization states among the plurality of polarization states.

As described above, the beam heading from the transmitting end to the receiving end (transmission beam of the transmitting end) can be determined through transmission of a signal to which one beam (specific beam) is applied and feedback based thereon. Accordingly, the number of physical resources required to perform beam alignment in a communication system in which pencil beams are utilized is reduced, and the time required for beam alignment can be shortened.

In addition, since hand shake (signaling between Tx/Rx) does not need to be performed multiple times for beam determination as in the multi-stage search method, signaling overhead/delay of procedures related to beam alignment can be reduced.

Effects that could be achieved with the present disclosure are not limited to those that have been described hereinabove merely by way of example, and other effects and advantages of the present disclosure will be more clearly understood from the following description by a person skilled in the art to which the present disclosure pertains.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

FIG. 1 is a view showing an example of a communication system applicable to the present disclosure.

FIG. 2 is a view showing an example of a wireless apparatus applicable to the present disclosure.

FIG. 3 is a view showing a method of processing a transmitted signal applicable to the present disclosure.

FIG. 4 is a view showing another example of a wireless device applicable to the present disclosure.

FIG. 5 is a view showing an example of a hand-held device applicable to the present disclosure.

FIG. 6 is a view showing physical channels applicable to the present disclosure and a signal transmission method using the same.

FIG. 7 is a view showing the structure of a radio frame applicable to the present disclosure.

FIG. 8 is a view showing a slot structure applicable to the present disclosure.

FIG. 9 is a view showing an example of a communication structure providable in a 6G system applicable to the present disclosure.

FIG. 10 is a diagram illustrating a wireless communication system utilizing a pencil beam to which a method according to an embodiment of the present disclosure can be applied.

FIG. 11 is a diagram to explain matters required in a beam search procedure depending on a beam width.

FIG. 12 illustrates a beam including inhomogeneous information according to an embodiment of the present disclosure.

FIG. 13 illustrates a quarter-wave plate related to generation of inhomogeneous polarization according to an embodiment of the present disclosure.

FIG. 14 is a diagram illustrating a Poincare sphere for expressing a synthesis of polarization light according to an embodiment of the present disclosure.

FIG. 15 illustrates Stokes parameters expressed in spherical coordinates according to an embodiment of the present disclosure.

FIG. 16 is a diagram illustrating an example of a wavefront related to polarization synthesis.

FIG. 17 is a diagram illustrating another example of a wavefront related to polarization synthesis.

FIG. 18 is a diagram illustrating a beam related to an inhomogeneous polarized wavefront.

FIGS. 19 to 22 illustrate superposed polarization according to superposition of a wavefront.

FIG. 23 illustrates an example of a transmitter structure that transmits an inhomogeneous polarization pattern according to an embodiment of the present disclosure.

FIG. 24 illustrates another example of a transmitter structure that transmits an inhomogeneous polarization pattern according to an embodiment of the present disclosure.

FIG. 25 illustrates another example of a transmitter structure that transmits an inhomogeneous polarization pattern according to an embodiment of the present disclosure.

FIG. 26 illustrates another example of a transmitter structure that transmits an inhomogeneous polarization pattern according to an embodiment of the present disclosure.

FIG. 27 illustrates various structures of an optical modulator.

FIG. 28 illustrates an element for configuring a beamforming optical system according to an embodiment of the present disclosure.

FIG. 29 illustrates an example of a receiver structure that receives an inhomogeneous polarization pattern according to an embodiment of the present disclosure.

FIG. 30 illustrates another example of a receiver structure that receives an inhomogeneous polarization pattern according to an embodiment of the present disclosure.

FIG. 31 is a diagram illustrating detection of an inhomogeneous polarization pattern according to an embodiment of the present disclosure.

FIG. 32 is a diagram for explaining a beam alignment operation based on an inhomogeneous polarization pattern according to an embodiment of the present disclosure.

FIG. 33 illustrates a detection point of a polarization pattern according to a receiver aperture according to an embodiment of the present disclosure.

FIG. 34 is a diagram illustrating a format of polarization state information fed back according to an embodiment of the present disclosure.

FIG. 35 illustrates a polarization pattern matrix related to an inhomogeneous polarization pattern according to an embodiment of the present disclosure.

FIG. 36 is a diagram for explaining a search operation of a polarization pattern related to multiple detection points according to an embodiment of the present disclosure.

FIG. 37 is a diagram for explaining an inhomogeneous polarization-based beam alignment procedure according to an embodiment of the present disclosure.

FIG. 38 is a diagram for explaining an inhomogeneous polarization-based beam alignment procedure according to another embodiment of the present disclosure.

FIG. 39 is a diagram for explaining an inhomogeneous polarization-based beam alignment procedure according to another embodiment of the present disclosure.

FIG. 40 is a flowchart for explaining a method performed by a first wireless device in a wireless communication system according to an embodiment of the present disclosure.

DETAILED DESCRIPTION

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

That is, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, on uplink (UL), a mobile station may serve as a transmitter and a BS may serve as a receiver. Likewise, on downlink (DL), the mobile station may serve as a receiver and the BS may serve as a transmitter.

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 illustrates an example of a communication system applicable to the present disclosure. Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 400. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 400 through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication system applicable to the present disclosure

FIG. 2 illustrates an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be connected with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be connected with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be connected with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be connected with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs) and/or one or more service data unit (SDU) according to the descriptions, functions, procedures, proposals, methods and/or operational flowcharts disclosed herein. One or more processors 202a and 202b may generate messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be connected with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be connected with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. For example, one or more transceivers 206a and 206b may be connected with one or more processors 202a and 202b to transmit/receive radio signals. For example, one or more processors 202a and 202b may perform control such that one or more transceivers 206a and 206b transmit user data, control information or radio signals to one or more other apparatuses. In addition, one or more processors 202a and 202b may perform control such that one or more transceivers 206a and 206b receive user data, control information or radio signals from one or more other apparatuses. In addition, one or more transceivers 206a and 206b may be connected with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

FIG. 3 is a view showing a method of processing a transmitted signal applicable to the present disclosure. For example, the transmitted signal may be processed by a signal processing circuit. At this time, a signal processing circuit 1200 may include a scrambler 300, a modulator 320, a layer mapper 330, a precoder 340, a resource mapper 350, and a signal generator 360. At this time, for example, the operation/function of FIG. 3 may be performed by the processors 202a and 202b and/or the transceiver 206a and 206b of FIG. 2. In addition, for example, the hardware element of FIG. 3 may be implemented in the processors 202a and 202b of FIG. 2 and/or the transceivers 206a and 206b of FIG. 2. In addition, for example blocks 310 to 350 may be implemented in the processors 202a and 202b of FIG. 2 and a block 360 may be implemented in the transceivers 206a and 206b of FIG. 2, without being limited to the above-described embodiments.

A codeword may be converted into a radio signal through the signal processing circuit 300 of FIG. 3. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 6. Specifically, the codeword may be converted into a bit sequence scrambled by the scrambler 310. The scramble sequence used for scramble is generated based in an initial value and the initial value may include ID information of a wireless device, etc. The scrambled bit sequence may be modulated into a modulated symbol sequence by the modulator 320. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 330. Modulation symbols of each transport layer may be mapped to corresponding antenna port(s) by the precoder 340 (precoding). The output z of the precoder 340 may be obtained by multiplying the output y of the layer mapper 330 by an N*M precoding matrix W. Here, N may be the number of antenna ports and M may be the number of transport layers. Here, the precoder 340 may perform precoding after transform precoding (e.g., discrete Fourier transform (DFT)) for complex modulation symbols. In addition, the precoder 340 may perform precoding without performing transform precoding.

The resource mapper 350 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 360 may generate a radio signal from the mapped modulation symbols, and the generated radio signal may be transmitted to another device through each antenna. To this end, the signal generator 360 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 310 to 360 of FIG. 3. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Structure of Wireless Device Applicable to the Present Disclosure

FIG. 4 is a view showing another example of a wireless device applicable to the present disclosure.

Referring to FIG. 4, a wireless device 400 may correspond to the wireless devices 200a and 200b of FIG. 2 and include various elements, components, units/portions and/or modules. For example, the wireless device 400 may include a communication unit 410, a control unit (controller) 420, a memory unit (memory) 430 and additional components 440. The communication unit may include a communication circuit 412 and a transceiver(s) 414. For example, the communication circuit 412 may include one or more processors 202a and 202b and/or one or more memories 204a and 204b of FIG. 2. For example, the transceiver(s) 414 may include one or more transceivers 206a and 206b and/or one or more antennas 208a and 208b of FIG. 2. The control unit 420 may be electrically connected with the communication unit 410, the memory unit 430 and the additional components 440 to control overall operation of the wireless device. For example, the control unit 320 may control electrical/mechanical operation of the wireless device based on a program/code/instruction/information stored in the memory unit 430. In addition, the control unit 420 may transmit the information stored in the memory unit 430 to the outside (e.g., another communication device) through the wireless/wired interface using the communication unit 410 over a wireless/wired interface or store information received from the outside (e.g., another communication device) through the wireless/wired interface using the communication unit 410 in the memory unit 430.

The additional components 440 may be variously configured according to the types of the wireless devices. For example, the additional components 440 may include at least one of a power unit/battery, an input/output unit, a driving unit or a computing unit. Without being limited thereto, the wireless device 400 may be implemented in the form of the robot (FIG. 1, 100a), the vehicles (FIGS. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 4, various elements, components, units/portions and/or modules in the wireless device 400 may be connected with each other through wired interfaces or at least some thereof may be wirelessly connected through the communication unit 410. For example, in the wireless device 400, the control unit 420 and the communication unit 410 may be connected by wire, and the control unit 420 and the first unit (e.g., 130 or 140) may be wirelessly connected through the communication unit 410. In addition, each element, component, unit/portion and/or module of the wireless device 400 may further include one or more elements. For example, the control unit 420 may be composed of a set of one or more processors. For example, the control unit 420 may be composed of a set of a communication control processor, an application processor, an electronic control unit (ECU), a graphic processing processor, a memory control processor, etc. In another example, the memory unit 430 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

FIG. 5 is a view showing an example of a hand-held device applicable to the present disclosure.

FIG. 5 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 5, the hand-held device 500 may include an antenna unit (antenna) 508, a communication unit (transceiver) 510, a control unit (controller) 520, a memory unit (memory) 530, a power supply unit (power supply) 540a, an interface unit (interface) 540b, and an input/output unit 540c. An antenna unit (antenna) 508 may be part of the communication unit 510. The blocks 510 to 530/540a to 540c may correspond to the blocks 410 to 430/440 of FIG. 4, respectively.

The communication unit 510 may transmit and receive signals (e.g., data, control signals, etc.) to and from other wireless devices or base stations. The control unit 520 may control the components of the hand-held device 500 to perform various operations. The control unit 520 may include an application processor (AP). The memory unit 530 may store data/parameters/program/code/instructions necessary to drive the hand-held device 500. In addition, the memory unit 430 may store input/output data/information, etc. The power supply unit 540a may supply power to the hand-held device 500 and include a wired/wireless charging circuit, a battery, etc. The interface unit 540b may support connection between the hand-held device 500 and another external device. The interface unit 540b may include various ports (e.g., an audio input/output port and a video input/output port) for connection with the external device. The input/output unit 440c may receive or output video information/signals, audio information/signals, data and/or user input information. The input/output unit 540c may include a camera, a microphone, a user input unit, a display 540d, a speaker and/or a haptic module.

For example, in case of data communication, the input/output unit 540c may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 540c in various forms (e.g., text, voice, image, video and haptic).

Physical Channels and General Signal Transmission

FIG. 6 is a view showing physical channels applicable to the present disclosure and a signal transmission method using the same.

The UE which is turned on again in a state of being turned off or has newly entered a cell performs initial cell search operation in step S611 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S612, thereby acquiring more detailed system information.

Thereafter, the UE may perform a random access procedure such as steps S613 to S616 in order to complete access to the base station. To this end, the UE may transmit a preamble through a physical random access channel (PRACH) (S613) and receive a random access response (RAR) to the preamble through a physical downlink control channel and a physical downlink shared channel corresponding thereto (S614). The UE may transmit a physical uplink shared channel (PUSCH) using scheduling information in the RAR (S615) and perform a contention resolution procedure such as reception of a physical downlink control channel signal and a physical downlink shared channel signal corresponding thereto (S616).

The UE, which has performed the above-described procedures, may perform reception of a physical downlink control channel signal and/or a physical downlink shared channel signal (S617) and transmission of a physical uplink shared channel (PUSCH) signal and/or a physical uplink control channel (PUCCH) signal (S618) as general uplink/downlink signal transmission procedures.

FIG. 7 is a view showing the structure of a radio frame applicable to the present disclosure.

UL and DL transmission based on an NR system may be based on the frame shown in FIG. 7. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM (A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |

TABLE 1-continued

| $\mu$ | $N_{symb}^{slot}$ | $N_{slot}^{frame, \mu}$ | $N_{slot}^{subframe, \mu}$ |
|---|---|---|---|
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

In Tables 1 and 2 above, Nslotsymb may indicate the number of symbols in a slot, Nframe,μslot may indicate the number of slots in a frame, and Nsubframe,μslot may indicate the number of slots in a subframe.

In addition, in a system, to which the present disclosure is applicable, OFDM (A) numerology (e.g., SCS, CP length, etc.) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 KHz/60 KHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
|---|---|---|
| FR1 | 410 MHz-7125 MHz | 15, 30, 60 KHz |
| FR2 | 24250 MHz-52600 MHz | 60, 120, 240 KHz |

FIG. 8 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P) RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

FIG. 9 is a view showing an example of a communication structure providable in a 6G system applicable to the present disclosure.

Referring to FIG. 9, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system.

Below, embodiments that can be applied in an optical wireless communication (OWC) system are discussed.

Symbols/abbreviations/terms related to the embodiments described later are as follows.

OF: Optical Frequency
OWC: Optical Wireless Communication
NLOS: Non Line of Sight
DSP: Digital Signal Processor
HP: Horizontal Polarization
VP: Vertical Polarization
RCP: Right-hand Circular Polarization
LCP: Left-hand Circular Polarization
REP: Right-hand Elliptical Polarization
LEP: Left-hand Elliptical Polarization
LG: Laguerre Gaussian
HG: Hermite Gaussian
TIA: Transimpedance Amplifier A method of controlling a beam in a wireless optical communication system is discussed.

In the case of a wireless optical communication system, unlike RF communication of LTE or NR, a very small beam width can be expected. In a mobile OWC system environment that considers mobility, fixed beams cannot be used like in OWC in a fixed point environment. Therefore, beam steering and tracking technology for a predefined cell area is required. For example, if the distance between the transmitter and receiver is 50 m, and a pencil beam with a half angle of beam divergence of about 100 micro-radians (beam waist is about 5 mm) is transmitted, the expected receiving end beam diameter is 5 mm to 3.5 cm. Hereinafter, it will be described with reference to FIG. 10.

FIG. 10 is a diagram illustrating a wireless communication system utilizing a pencil beam to which a method according to an embodiment of the present disclosure can be applied. Referring to FIG. 10, for a cell area (1m×1m) near the location of the receiving end, considering an aperture of $1\ cm^2$, there are a total of 10,000 beams.

In systems that utilize pencil beams as described above (e.g. Mobile OWC, Terahertz Communication, etc.), a large number of Tx/Rx beams may exist within a single cell. For the initial access stage for forming a link between Tx and Rx and maintenance of link connection, beam alignment needs to be guaranteed. A beam tracking procedure is required for such beam alignment.

When the number of beams is large, the beam search time to check the degree of alignment for each beam may also increase in proportion to the number of beams. Below, beam search methods (i, ii) according to the prior art will be examined.

i) In case of 3GPP NR, Beam Search is performed through SSB. This method uses as many symbols as the number of beams. That is, the beam search procedure based on SSB is performed in a symbol level beam search method. According to the above example, since beam search must be performed for a time corresponding to 10,000 symbols, it causes very large resource loss.

ii) Multi-stage Beam Search method is performed in the following order. The broad beam is searched, and the narrow beam within the broad beam is searched. This method requires hand shaking between Tx and Rx, so a delay is required due to hand shaking.

As seen in i) and ii) above, in systems using pencil beams, resource loss and delay occur due to the large number of beams.

Below, a method for solving the above-mentioned problems will be discussed.

FIG. 11 is a diagram to explain matters required in a beam search procedure depending on a beam width.

In a general beam search procedure, one beam contains one homogeneous information, and the ability to distinguish beams is determined by the relationship between the beam and the aperture. Elements that distinguish beams may be composed of units that distinguish physical resources such as time, frequency, and space.

Referring to (a) of FIG. 11, a beam search procedure is performed at the transmitting end using a Broad beam. In this case, only one beam is used for a large area, and the receiving end can perform detection for the beam. This method has an advantage in terms of the number of beams, but fine tuning suitable for the receiving aperture is not possible. In other words, even if the receiving end detects the beam, it is difficult for the transmitting end to align the beam used for the receiving end as a beam more suitable for the location of the receiving end.

Referring to (b) of FIG. 11, a beam search procedure is performed at the transmitting end using a narrow beam. In this case, one beam is used for a narrow area, and the receiving end performs detection on the beam related to the area where the receiving end is located. In the case of this method, fine tuning suitable for the receiving aperture is possible, but the search must be performed repeatedly several times to find the beam related to the area where the receiving end is located. Therefore, many physical resources are required.

The present disclosure proposes a method of utilizing one beam including inhomogeneous information/heterogeneous information. Specifically, for a beam including inhomogeneous information, different information is detected depending on the detection location of the beam. Through this, a beam detection operation performed using multiple beams can be performed at once. Hereinafter, an outline of the above-described operation will be described with reference to FIG. 12.

FIG. 12 illustrates a beam including inhomogeneous information according to an embodiment of the present disclosure.

Referring to FIG. 12, one beam transmitted by the transmitting end includes inhomogeneous information (e.g. A, B, C, D . . . ). Accordingly, different information (e.g., K) is detected depending on the location where the corresponding beam is detected. This will be described in more detail below.

In an environment where time/frequency/space, which is a physical resource distinguishing a beam in a beam search procedure, is the same, a beam configured to include inhomogeneous information may be referred to as an inhomogeneous beam. At this time, inhomogeneous information may be intensity, phase, or polarization, etc.

Referring to FIG. 12, the transmitter transmits a Broad Inhomogeneous beam to the cell area for a beam search procedure. The transmitted Broad Inhomogeneous Beam is radiated to the entire cell area. The radiated beam includes inhomogeneous information (letters A to R), and the inhomogeneous information is detected as information depending on the location.

Specifically, the detected information may vary depending on the location of the receiving aperture of the receiver. In the above example, the location of the receiving aperture is located in a partial area of the beam where K information is transmitted.

When the receiver feeds back the information (K) detected in the reception aperture to the transmitter, the transmitter can obtain the orientation of the transmission and reception link.

Hereinafter, information related to the generation of inhomogeneous polarization will be discussed.

Generation of Inhomogeneous Information

Inhomogeneous Beam can be defined as follows.

An optical beam that has inhomogeneous information (non-identical information, e.g. Intensity, Phase, Polarization, etc.) about the wavefront perpendicular to the optical axis of the optical beam from the perspective of transmission and reception Hereinafter, the types of inhomogeneous information for generating an inhomogeneous beam will be discussed.

It can be assumed that inhomogeneous information for generating an inhomogeneous beam is composed of intensity or phase. At this time, intensity/phase changes depending on the distance between the transmitter and receiver. Therefore, it is not possible to distinguish between changes in intensity or phase depending on location with respect to the optical axis and changes depending on distance. At this time, when the transmitting end uses a reference signal to deliver reference intensity or reference phase information, the intensity and phase that change depending on the distance between the transmitting and receiving end can be compensated and the inhomogeneous intensity and inhomogeneous phase can be utilized. For example, if a reference beam with homogeneous intensity and an inhomogeneous beam with inhomogeneous intensity are sequentially transmitted in the same area within a preconfigured time (hereinafter, Coherence Time), the beam for the receiver can be determined in the following manner. Depending on the location of the receiving aperture, the orientation of the receiving aperture (i.e. the beam heading from the transmitting end to the receiving end) can be inferred through the difference between the intensity information measured from the homogeneous intensity beam and the intensity information measured from the inhomogeneous intensity beam.

In the same way in the case of the phase information, the orientation of the receiving aperture can be inferred through sequential transmission of the homogeneous phase and the inhomogeneous phase.

As described above, in the method of configuring inhomogeneous information using Intensity or Phase, the Reference Beam must be transmitted within the Coherence Time.

On the other hand, it can be assumed that the inhomogeneous information for the generation of the inhomogeneous beam is composed of polarization. Polarization does not change with distance. Therefore, inhomogeneous polarization can be used as information independent of distance and channel.

Hereinafter, details related to the generation of inhomogeneous polarization through birefringence will be described.

Generation of Inhomogeneous Polarization Via Birefringence

Optical elements utilizing birefringent materials, such as a half-wave plate (HWP) or quarter-wave plate (QWP), can change the polarization of an incident beam. Birefringent elements have different refractive indices along two axes.

The two axes include the fast axis and the slow axis. When a beam aligned with the fast axis passes through the HWP, it passes faster than when a beam aligned with the slow axis passes through the HWP. In general, linear polarization can be expressed as the sum of fast axis and slow axis components, so the polarization of the beam changes when passing through a birefringent material. The optical element that performs this function is called a phase retarder. The polarization change of the output beam is determined according to the relationship between the polarization of the incident beam and the fast axis direction of the phase retarder.

HWP is used to convert Horizontal Polarization (H-pol) to Vertical Polarization (V-pol) and Vertical Polarization (V-pol) to Horizontal Polarization (H-pol).

QWP is used to convert linear polarization to circular polarization. FIG. 13 illustrates a quarter-wave plate related to a generation of inhomogeneous polarization according to an embodiment of the present disclosure.

Spatially variant half waveplate (SHWP), Spatially varying retarder (SVR), four-quadrant quarter waveplate (FQWP), etc. can be constructed by combining birefringent elements with different fast axes based on the above-mentioned devices. By passing a beam composed of homogeneous polarization through a device implemented using the above-mentioned HWP, QWP, SHWP, SVR, FQWP, etc., an inhomogeneous polarization output beam can be obtained.

Alternatively, inhomogeneous polarization can be generated through a Graded Index (GRIN) Lens, which is an optical element to solve modal dispersion. GRIN Lens is a device whose refractive index decreases from the center of the core to the outside, and the speed of light in the center of the core is slower than that outside. This solves the problem of modal dispersion, but birefringence is generated due to the difference in refractive index. When a collimated beam passes through a GRIN Lens, a polarization change is generated within the wavefront of the incident beam due to the difference in refractive Index and birefringence.

Inhomogeneous polarization can be generated based on the above-mentioned devices, but since inhomogeneous polarization is determined by the device, a change in the device is required to change the polarization pattern.

Below, the generation of inhomogeneous polarization through a polarization superposition is examined.

Generation of Inhomogeneous Polarization via Polarization Superposition

A signal with arbitrary polarization can be expressed as the sum of two polarization signals. For example, the polarization can be expressed as the sum of polarization 1 and polarization 2 as follows.

Polarization 1+Polarization 2=Superposed Polarization(for Homogeneous Symbol)

The above contents can be expressed in the following mathematical equation.

$$A_m e^{-j\theta_m} |P_m\rangle + A_n e^{-j\theta_n} |P_n\rangle = A_c e^{-j\theta_c} |P_c\rangle \quad \text{[Equation 1]}$$

Here, $A_m$ and $A_n$ represent the amplitude of the m/nth signal, $A_c$ represents the amplitude of the synthesized signal, $\theta_m$ and $\theta_n$ represent the phase of the m/nth signal, $\theta_c$ represents the phase of the synthesized signal. $|P_m\rangle$ and $|P_n\rangle$ represent the polarization of the m/nth signal, and $|P_c\rangle$ represents the polarization of the synthesized signal. At this time, polarization can be expressed as a Jones Vector.

Jones Vector is a vector representing polarization and can be expressed as Table 5 below.

TABLE 5

| Polarization | Jones vector | Typical ket notation |
|---|---|---|
| Linear polarized in the x direction Typically called "horizontal" | $\begin{pmatrix}1\\0\end{pmatrix}$ | $\|H\rangle$ |
| Linear polarized in the y direction Typically called "vertical" | $\begin{pmatrix}0\\1\end{pmatrix}$ | $\|V\rangle$ |
| Linear polarized at 45° from the x axis Typically called "diagonal" L + 45 | $\frac{1}{\sqrt{2}}\begin{pmatrix}1\\1\end{pmatrix}$ | $\|D\rangle = \frac{1}{\sqrt{2}}(\|H\rangle + \|V\rangle)$ |
| Linear polarized at −45° from the x axis Typically called "anti-diagonal" L − 45 | $\frac{1}{\sqrt{2}}\begin{pmatrix}1\\-1\end{pmatrix}$ | $\|A\rangle = \frac{1}{\sqrt{2}}(\|H\rangle + \|V\rangle)$ |
| Right-and circular polarized Typically called "RCP" or "RHCP" | $\frac{1}{\sqrt{2}}\begin{pmatrix}1\\-i\end{pmatrix}$ | $\|R\rangle = \frac{1}{\sqrt{2}}(\|H\rangle + i\|V\rangle)$ |
| Left-and circular polarized Typically called "LCP" or "LHCP" | $\frac{1}{\sqrt{2}}\begin{pmatrix}1\\+i\end{pmatrix}$ | $\|L\rangle = \frac{1}{\sqrt{2}}(\|H\rangle + i\|V\rangle)$ |

At this time, in the synthesis of polarization, the characteristics of the synthesis polarization may vary depending on the difference in amplitude or phase of each polarization. For example, it can be illustrated as follows.

$A_1 e^{-j\theta_1} |H\rangle + A_2 e^{-j\theta_2} |V\rangle = |+45\rangle$, for $\theta_1 = \theta_2$ and $A_1 = A_2$ $A_1 e^{-j\theta_1} |H\rangle + A_2 e^{-j\theta_2} |V\rangle = |-45\rangle$, for $\theta_1 + \pi = \theta_2$ and $A_1 = A_2$ -continued $A_1 e^{-j\theta_1} |H\rangle + A_2 e^{-j\theta_2} |V\rangle = |RCP\rangle$, for $\theta_1 + \pi/2 = \theta_2$ and $A_1 = A_2$ $A_1 e^{-j\theta_1} |H\rangle + A_2 e^{-j\theta_2} |V\rangle = |LCP\rangle$, for $\theta_1 - \pi/2 = \theta_2$ and $A_1 = A_2$ $A_1 e^{-j\theta_1} |RCP\rangle + A_2 e^{-j\theta_2} |LCP\rangle = |REP\rangle$, for $\theta_1 = \theta_2$ and $A_1 > A_2$ $A_1 e^{-j\theta_1} |RCP\rangle + A_2 e^{-j\theta_2} |LCP\rangle = |LEP\rangle$, for $\theta_1 = \theta_2$ and $A_1 < A_2$ $|H\rangle$ and $|V\rangle$ are linear polarization and represent horizontal polarization and vertical polarization, respectively.

$|+45\rangle$ and $|-45\rangle$ represent +45 degree polarization and −45 degree polarization, respectively, based on the x-axis.

$|RCP\rangle$ and $|LCP\rangle$ are circular polarization and represent Right-hand Circular Polarization and Left-hand Circular Polarization.

$|REP\rangle$ and $|LEP\rangle$ are elliptical polarization and represent Right-hand Elliptical Polarization and Left-hand Elliptical Polarization, respectively.

The following matters can be considered to express the synthesis of polarization.

A beam that expresses all changes in the characteristics of synthetic polarization depending on the difference in amplitude or phase of polarization can be defined as a Poincare beam.

The spherical space representing the Poincare beam in all cases can be defined as a Poincare Sphere. At this time, when the two basis polarizations are RCP and LCP, the Poincare Sphere expressed based on the difference in amplitude and phase of each basis can be expressed as shown in FIG. 14.

FIG. 14 is a diagram illustrating a Poincare sphere for expressing a synthesis of polarization light according to an embodiment of the present disclosure.

Referring to FIG. 14, Stokes Parameters (S0, S1, S2, S3) for expressing all polarization states on the Poincare Sphere can be defined as follows.

$$S_0 = E_x^2 + E_y^2$$
$$S_1 = E_x^2 - E_y^2$$
$$S_2 = 2E_x E_y \cos\delta$$
$$S_3 = 2E_x E_y \sin\delta$$

Here, $E_x$ and $E_y$ represent the E-field in the x-axis direction and the E-field in the y-axis direction, and generally correspond to Horizontal Polarization and Vertical Polarization. δ represents the phase difference between $E_x$ and $E_y$.

The meaning of each Stokes parameter (S0~S3) is as follows.

S0 represents the total intensity of the polarization state. S1 represents the ratio difference between Horizontal Polarization and Vertical Polarization. S2 represents the ratio difference between +45 degree Linear Polarization and −45 degree Linear Polarization. S3 represents the ratio difference between Right-hand Circular Polarization and Left-hand Circular Polarization. Hereinafter, Stokes parameters will be described in relation to spherical coordinates with reference to FIG. 15.

FIG. 15 illustrates Stokes parameters expressed in spherical coordinates according to an embodiment of the present disclosure.

Referring to FIG. 15, the Stokes parameters (S0 to S3) can be expressed in spherical coordinates as follows.

$$S_0 = I$$
$$S_1 = Ip \cos 2\Psi \cos 2X$$
$$S_2 = Ip \sin 2\Psi \cos 2X$$
$$S_3 = Ip \sin 2X$$

Here, I represents the Total Intensity of Polarization State.

p represents the degree of polarization, and depending on its value, the degree of polarization is expressed as follows. p=0 can be defined as Unpolarized, 0<p<1 can be defined as Partially Polarized, and p=1 can be defined as Fully Polarized.

Ψ is the orientation angle, which represents the elliptical direction of elliptical polarization and satisfies $$\Psi = \frac{1}{2}\arctan\left(\frac{S_2}{S_1}\right).$$

X is the ellipticity angle, which represents the degree of ellipticity of elliptical polarization and satisfies $$X = \frac{1}{2}\arctan\left(\frac{S_3}{\sqrt{S_1^2 + S_2^2}}\right).$$

Therefore, since Ψ and X are not affected by Total Intensity I andDegree of Polarization p, they can be defined as angles based on the S1 axis on a Poincare Sphere whose size is fixed to 1. In the present disclosure, Ψ and X are defined as Poincare Sphere Angle.

Hereinafter, with reference to FIGS. 16 and 17, a concept of polarization synthesis will be explained along with a wavefront.

FIG. 16 is a diagram illustrating an example of a wavefront related to polarization synthesis.

FIG. 16 illustrates an example of extending a polarization synthesis concept to a wavefront for an arbitrary beam. It is assumed that Wavefront 1 is a Horizontal Polarized Wavefront which is a Plane Wave with $\theta_1$, and wavefront 2 is a Vertical Polarized Wavefront which is a Plane Wave with $\theta_2$.

Superposed Wavefront becomes Right-hand Circular Polarized Wavefront. Here, it is assumed that there is a relationship of $\theta_i + \pi/2 = \theta_{i+1}$. In other words, when each Homogeneous Polarized Wavefront has a Homogeneous Phase, the Superposed Wavefront also has Homogeneous Polarization.

FIG. 17 is a diagram illustrating another example of a wavefront related to polarization synthesis.

Referring to FIG. 17, a case where the wavefront has an Inhomogeneous Phase is illustrated. Here, Inhomogeneous Phase is defined as a case where the phases are not the same within the same Wavefront. For example, Larguerre-Gaussian (LG) Beam or Hermite-Gaussian (HG) Beam have an Inhomogeneous Phase.

It is assumed that Wavefront 1 is a Horizontal Polarized Wavefront which is a Plane Wave with $\theta_1$, and wavefront 2 is a Vertical Polarized Wavefront which is a Helical Wave with $\theta_1$ to $\theta_4$.

Superposed Wavefront becomes Inhomogeneous Polarized Wavefront. Here, it is assumed that there is a relationship of $\theta_i + \pi/2 = \theta_{i+1}$. In other words, if each Homogeneous Polarized Wavefront has an Inhomogeneous Phase, it can have different phase differences for each location within the Superposed Wavefront. Through this, the polarization synthesized for each internal location of the superposed wavefront can be changed to have Inhomogeneous Polarization. Hereinafter, the Inhomogeneous Polarized Wavefront will be described with reference to FIG. 18.

FIG. 18 is a diagram illustrating a beam related to an inhomogeneous polarized wavefront.

LG Beam is a Gaussian Beam with Orbital Angular Momentum (OAM) characteristics, and has the characteristic of rotating the phase within the wavefront according to the phase rotation characteristic parameter called LG Beam order, OAM order, or Topological Charge. When the wavefront through which electromagnetic waves (or photons) are propagated at the same time is called a wavefront or phasefront, plane phasefront (or plane wave) refers to that the phase of all electromagnetic waves on the wavefront being propagated at the same time is the same. In FIG. 18, this means the case where m=0.

Referring to FIG. 18, the first column represents electromagnetic waves having the same phase in the propagation direction on the same wave front, and the second column is a phase diagram, and represents the distribution of the phases when viewed from the propagation direction at a single time. The third column is an intensity diagram, and represents the distribution of light intensity when viewed from the propagation direction at a single time.

If it is not a plane wave (not m=0), the beam has a helical phasefront and can generally be said to be an electromagnetic wave with OAM. Light carries an orbital angular momentum.

Since OAM is the definition of a wavefront, electromagnetic waves at each point may be linear polarized or circular polarized. By optical definition, OAM can be referred to as Laguerre-Gaussian modes (LG Beam) or Cylindrical transverse mode patterns TEM (pl).

In the present disclosure, p=0 for TEM (pl), and 1 is defined as a value corresponding to the LG Beam order. For example, LG Beam order 3 or OAM mode 3 is TEM (03). LG Beam order is an Integer Value and when it has a negative value, the direction in which the phase rotates within the wavefront is opposite to the direction at positive values.

FIGS. 19 to 22 illustrate overlapped polarization according to an overlap of wavefronts.

FIG. 19 illustrates a case where two wavefronts overlap (concentric superposition case 1 with two wavefronts). The polarization/phase rotation characteristics of each wavefront are as follows.

Wavefront 1: RCP, LG beam with order −1
Wavefront 2: LCP, LG beam with order +1

FIG. 20 illustrates another example of two wavefronts overlapping (concentric superposition Case 2 with two wavefronts). The polarization/phase rotation characteristics of each wavefront are as follows.

Wavefront 1: RCP, LG beam with order −1
Wavefront 2: LCP, LG beam with order 0

FIG. 21 illustrates a case where four wavefronts overlap (concentric superposition case with four wavefronts). The polarization/phase rotation characteristics of each wavefront are as follows.

Wavefront 1: RCP, LG beam with order −5
Wavefront 2: LCP, LG beam with order +5

Wavefront 3: HP, LG beam with order 0
Wavefront 4: VP, LG beam with order +1

FIG. 22 illustrates another example of four wavefronts overlapping (arbitrary superposition case with four wavefronts). While concentric superposition is assumed in FIGS. 19 to 21, arbitrary superposition is assumed in FIG. 22. The polarization/phase rotation characteristics of each wavefront are as follows.

Wavefront 1: RCP, LG beam with order −2
Wavefront 2: LCP, LG beam with order +2
Wavefront 3: HP, LG beam with order −2
Wavefront 4: VP, LG beam with order +2

In order to generate the Inhomogeneous Polarized Wavefront above, two or more Homogeneous Polarized Wavefronts can be synthesized. At this time, the distribution of the polarization state of the synthesized beam may vary depending on the number and configuration of the synthesized Homogeneous Polarized Wavefront.

The following points can be considered in relation to the generation of the Inhomogeneous Polarized Wavefront.

When two or more homogeneous polarized wavefronts are synthesized to generate an inhomogeneous polarized wavefront, the optical axis (or center) of the beam may be aligned identically (e.g. FIGS. 19 to 21), or may be arbitrarily deviated and synthesized (e.g. FIG. 22), and the distribution of the polarization state of the synthesized beam may vary depending on the degree.

When two or more homogeneous polarized wavefronts are synthesized to generate an inhomogeneous polarized wavefront, the basis of homogeneous polarization of each wavefront may be orthogonal or non-orthogonal, and the distribution of polarization of the synthesized beam may vary depending on the basis polarization used.

When two or more homogeneous polarized wavefronts are synthesized to generate an inhomogeneous polarized wavefront, the distribution of polarization of the synthesized beam may vary depending on the Initial Phase value of each wavefront.

When two or more homogeneous polarized wavefronts are synthesized to generate an inhomogeneous polarized wavefront, the distribution of polarization of the synthesized beam may vary depending on the Initial Amplitude value of each wavefront.

When two or more homogeneous polarized wavefronts are synthesized to generate an inhomogeneous polarized wavefront, the distribution of polarization of the synthesized beam may vary depending on the distribution of the homogeneous phase of each wavefront.

In the present disclosure, Inhomogeneous Polarization is generated based on the Wavefront unit, and is defined as an Inhomogeneous Polarization Pattern.

Hereinafter, with reference to FIGS. 23 to 30, the structures of the transmitter and receiver related to Inhomogeneous Polarization according to an embodiment of the present disclosure will be examined.

FIGS. 23 to 28 describe content related to a transmitting device that transmits an inhomogeneous polarization pattern, and FIGS. 29 and 30 describe a receiving device that detects the polarization state by receiving an inhomogeneous polarization pattern.

Transmitter Structure

FIG. 23 illustrates an example of a transmitter structure that transmits an inhomogeneous polarization pattern according to an embodiment of the present disclosure.

Referring to FIG. 23, the inhomogeneous polarization pattern transmitter consists of a digital signal processor unit that processes digital data, an optical signal processor unit that generates an optical source based on inhomogeneous polarization pattern, and a transmit beamforming optics unit that beamforms a signal based on the generated inhomogeneous polarization pattern.

Digital Signal Processor

The digital signal processor unit consists of an encoder unit that performs encoding of data to be transmitted, a modulator unit that modulates the encoded data, and a digital-to-analog convertor (DAC) unit that converts modulated digital signals into analog signals. The converted Analog Signal is applied to the Optical Modulator of the Optical Signal Processor.

The encoder unit is a module that encodes the bit stream, which is digital data to be transmitted from the transmitter, and is the same as the module that performs channel coding to ensure reliability of data against channel fading in an RF communication system. All well-known existing Channel Coding technologies can be applied. Various channel coding technologies such as Reed-Solomon (RS), Turbo, Convolutional, low-density parity check (LDPC), and Polar Code can be applied.

The modulator unit is a module that modulates the coded bit stream encoded from the encoder into a symbol, and can be divided into a modulation method based on the intensity of the signal (e.g. Intensity Modulation/Direct Detection (IM/DD)) and a modulation method based on the intensity and phase of the signal (e.g. Coherent Transmission and Detection).

The IM/DD method based on Intensity converts the information of the Coded Bit Stream into the Intensity of the Symbol. The IM/DD method can be divided into a single carrier method that performs constellation mapping of the coded bit stream using intensity only in time domain, and a multicarrier method that performs constellation mapping of the coded bit stream using intensity and phase in the time/frequency domain and then reconfigures it only to the intensity of the time domain.

The single carrier method that performs constellation mapping using only intensity in the time domain may include the following methods.

On/Off Keying (OOK), Pulse Amplitude Modulation (PAM), Pulse Position Modulation (PPM), Pulse Width Modulation (PWM)

The multicarrier method that performs constellation mapping using intensity and phase may include the following methods.

DC biased Optical OFDM (DCO-OFDM), Asymmetrically Clipped Optical OFDM (ACO-OFDM), Asymmetrically clipped DC biased Optical OFDM (ADO-OFDM), Pulse Amplitude Modulated Discrete Multi-tone Modulation (PAM-DMT) represented only by intensity in the time domain Methods such as Quadrature Amplitude Modulation (QAM) used in existing communication systems can be used to map constellation with intensity and phase. In other words, according to the IM/DD method, the optical source is multiplied with only intensity information, no matter how the signal is modulated in the Digital Signal Processor, when mixed with the optical signal generated by the optical source.

The Coherent Transmission and Detection method based on Intensity and Phase converts the information of the Coded Bit Stream into the Intensity and Phase of the Symbol. Methods such as Quadrature Amplitude Modulation (QAM) used in existing communication systems can be used to map constellation with intensity and phase. The constellation mapped symbol information generates a multicarrier symbol through the multicarrier method of the existing communication system (e.g. OFDM, CP-OFDM, DFT-s OFDM, etc.). According to the Coherent Transmission and Detection method, the in-phase information and quadrature information used when generating a symbol in the Digital Signal Processor are converted into DAC, respectively, and DACs are multiplied with the optical signal generated by the Optical Source to be a state that has both intensity information and phase information.

The IM/DD method and the Coherent Transmission and Detection method described above have different operation of the modulator module and different characteristics depending on the Mobile OWC System configuration. In general, the IM/DD method may cause SE damage or SNR damage from the perspective of received data, but simplify transmission and reception devices. On the other hand, the Coherent Transmission and Detection method adopts the existing Multicarrier System as is, so it can implement existing performance trends without loss of SE or SNR, but has problems with the use of additional modules or increased module complexity from the perspective of the transmitter and receiver. Therefore, it is necessary to select or adaptively utilize a transmission and reception method suitable for configuring the Mobile OWC System.

The Digital-to-Analog Convertor (DAC) unit converts the Electric Symbol modulated by the Modulator into an Analog Signal. The DAC unit can convert digital signals into analog signals through up-sampling and pulse shaping. The converted analog signal is multiplied by the optical signal in the optical modulator of the inhomogeneous polarization beam generator. Optical Signal Processor The Optical Signal Processor unit consists of an optical source unit that performs optical signal generation, and an inhomogeneous polarization beam generator that converts the signal generated from the Optical Source into an Inhomogeneous Polarization Pattern and applies the analog signal received from the Digital Signal Processor. The generated Optical Modulated Signal based on Inhomogeneous Polarization is applied to Transmit Beamforming Optics and radiated toward the Receiver.

The Optical Source unit is a component that generates an optical signal corresponding to the IR band used in Mobile OWC and may be composed of a Laser Diode (LD) or Light Emitting Diode (LED), etc. The LD can be replaced with a solid-state laser or gas laser based on the principle of stimulated emission within the cavity for high output.

LD is generally a semiconductor laser and performs laser oscillation by stimulated emitting naturally emitted photons through recombination of electrons and holes in a PN junction diode structure. Therefore, it is smaller than a solid-state laser or gas laser, has high efficiency, and can operate with low power. Since LD generates a Laser Source, the generated optical signal has plane wave characteristics with the same phase within the wavefront, making it easy to form a Gaussian Beam, and is radiated as a Narrow Beam with high straightness.

On the other hand, LED generates naturally emitted photons through recombination of electrons and holes in the PN junction diode structure, so the generated optical signal has random phase characteristics without uniform phase characteristics within the wavefront, and radiates in all directions if there is no separate beam controller.

Since the Mobile OWC system is intended for outdoor long-distance environments, a Laser-based module with high straightness and high output optical source is preferred. Depending on module miniaturization and low power requirements, semiconductor-based LD Laser sources can be classified into Continuous Wave Laser (CW-Laser) and can be applied.

Mode Locked Laser depending on the generation method. CW-Laser is a device that continuously oscillates with a temporally constant output. Mode Locked Laser is a device that has matching characteristics of CW-Laser Sources with frequency of constant magnification. Mode Locked Laser generates a Time Repetition Pulse Train based on a period equal to the reciprocal of the frequency difference on the time axis. When observed from the frequency axis perspective, this characteristic has Frequency Comb characteristics.

FIG. 24 illustrates another example of a transmitter structure that transmits an inhomogeneous polarization pattern according to an embodiment of the present disclosure.

Specifically, FIG. 24 illustrates the structure of a transmitter implemented based on a birefringent optical element. Hereinafter, the description of the same configuration as in FIG. 23 is omitted because it is redundant.

Birefringent Optical Element can be implemented by combining birefringent elements with different fast axes. The birefringent optical element may be implemented to include at least one of a spatially variant half waveplate (SHWP), a spatially varying retarder (SVR), and a four-quadrant quarter waveplate (FQWP). Homogeneous Polarization Beam generated from the Optical Source passes through the Birefringent Optical Element. Birefringent Optical Element outputs an Inhomogeneous Polarization beam to an optical modulator.

Alternatively, the Birefringent Optical Element can be implemented using a Graded Index (GRIN) Lens, which is an optical element to solve modal dispersion.

The Birefringent Optical Element mentioned above can be implemented in various ways depending on the combination of detailed optical elements, and the output inhomogeneous polarization pattern is different depending on the configuration of the element.

Inhomogeneous polarization beam generated through a birefringent optical element is transmitted by mixing the analog signal output from the DAC in the optical modulator.

FIG. 25 illustrates another example of a transmitter structure that transmits an inhomogeneous polarization pattern according to an embodiment of the present disclosure.

Specifically, FIG. 25 illustrates the structure of a transmitter based on polarization superposition. Hereinafter, the description of the same configuration as in FIG. 23 is omitted because it is redundant.

The Polarization Superposition-based Inhomogeneous Polarization Beam Generator may be composed of a Polarization Ratio Controller, a Polarization Beam Splitter, a Phase Retarder, an Optical Mode Controller, and an Optical Coupler.

The Polarization Ratio Controller can be implemented with a Polarizer and Half-wave Plate. Polarization Ratio Controller is used to convert an unpolarized beam or polarized beam generated from an optical source into the desired linear polarization direction. Depending on the direction of controlled linear polarization, the ratio of horizontal polarization and vertical polarization is determined.

Polarization Beam Splitter is an optical device that splits Horizontal Polarization and Vertical Polarization. The Polarization Beam Splitter splits the Horizontal Polarization and Vertical Polarization components of Linear Polarization received from the Polarization Ratio Controller.

A phase retarder is a device that converts the polarization of an incident beam and may be composed of a half-wave plate or quarter-wave plate.

Each Horizontal Polarization and Vertical Polarization split from the Polarization Beam Splitter are converted into the polarization to be generated by the Phase Retarder.

The optical mode controller may be implemented to include at least one of an Optical Amplifier, a Phase Controller, a Spatial Light Modulator, a Spiral Phase Plate, a Phase Shift Hologram, and a Metasurface.

The optical amplifier can control the optical amplitude of each split beam.

The phase controller can control the initial phase of each split beam.

A Spatial Light Modulator, a Spiral Phase Plate, a Phase Shift Hologram, a Metasurface, etc. can control the LG Beam or HG Beam Order, which is the mode of each split beam.

An optical coupler is an optical device that re-superposes each branched and converted beam.

Inhomogeneous polarization beam generated through polarization superposition is transmitted by mixing the analog signal output from the DAC in the optical modulator.

An example of the operation of the Polarization Superposition-based Inhomogeneous Polarization Beam Generator is as follows.

Unpolarized Beam generated from the Optical Source is converted to +45 degree Linear Polarization in the Polarization Ratio Controller.

+45 degree Linear Polarization is a state in which the ratio of Horizontal Polarization and Vertical Polarization are the same, so it splits into Horizontal Polarization and Vertical Polarization in each path at the same ratio in the Polarization Beam Splitter.

If the phase retarder of the Horizontal Polarization Path is QWP, it is converted to RCP, and if the phase retarder of the Vertical Polarization Path is QWP, it is converted to LCP.

If the optical modulator in the RCP path is LG Beam order m, the output beam becomes LGm|RCP⟩. In the same way, if the optical modulator in the LCP path is LG Beam order n, the output beam becomes LGn|LCP⟩. Here, LGm or LGn means a signal with LG Beam order m or n.

The two beams are superpositioned in the optical coupler to form a synthesis beam, and the synthesis beam is an Inhomogenenous Polarization beam.

If there is an optical amplifier and an optical phase shifter in the optical modulator of each path, the amplitude and phase are controlled in each path. If the Amplitude and Phase controlled in each Path are $A_m$, $A_n$ and $\theta_m$, $\theta_n$, the output synthesized signal can be expressed as follows.

$$A_m e^{-j\theta_m} LG_m|RCP\rangle + A_n e^{-j\theta_n} LG_n|LCP\rangle = A_c e^{-j\theta_c}|P_c\rangle \quad \text{[Equation 2]}$$

In the above, some elements may be replaced with a single element that performs two or more identical functions.

For convenience of explanation, synthesis of two beams is exemplified above, but it is obvious that synthesis is possible based on other combinations. At this time, the synthesis method can be implemented by repeating the method exemplified above and performing additional synthesis.

FIG. 26 illustrates another example of a transmitter structure that transmits an inhomogeneous polarization pattern according to an embodiment of the present disclosure.

Specifically, FIG. 26 illustrates the structure of a transmitter implemented so that four beams are synthesized to form an Inhomogenenous Polarization beam in the structure of the transmitter based on polarization superposition. Hereinafter, descriptions of the same configurations as those in FIGS. 23 and 25 will be omitted since they are redundant.

The optical modulator is a module that performs optical modulation on the optical source and the homogeneous beam generated by the inhomogenenous polarization beam generator based on the analog signal received from the digital signal processor. The optical modulator can be implemented differently depending on the transmission and reception methods: Intensity Modulation/Direct Detection (IM/DD) and Coherent Transmission and Detection.

In the IM/DD method, as optical modulators, modules such as Mach-Zehnder Modulator (MZM) and Electro-Absorption Modulator (EAM) can be used.

MZM is a device that configures two phase modulators in parallel, splits the incident optical signal into two, and combines them after the phase modulator operation of each path. At this time, the operation of the Phase Modulator is as follows.

Phase Modulator operates by analog signals applied from the Digital Signal Processor. When the same phase is applied by the operation of two phase modulators, MZM operates as a phase modulator that maintains intensity and changes only the phase through constructive interference.

If there is a phase difference of n due to the operation of two phase modulators, MZM operates as an intensity modulator that utilizes the phenomenon of intensity disappearing due to destructive interference.

EAM is a semiconductor device that controls the intensity of optical signals based on voltage, and operates by the Franz-Keldysh effect, which changes the degree of photon absorption in a semiconductor when an electric field is applied. As a semiconductor device, EAM has the characteristics of being easy to integrate, but since the output optical power is about 3 dBm, an optical amplifier is required.

FIG. 27 illustrates various structures of an optical modulator.

In the Optical Phase Modulator, the phase change value is determined by Wavelength, Electrode Length, and Effective Refractive Index. At this time, the Effective Refractive Index has a linear relationship with the external control voltage, u (t), and the Effective Refractive Index changes according to the change in the external voltage, which leads to phase control.

When the external control voltage that generates a phase shift of n is $V_\pi$, the transfer function of the optical phase modulator can be expressed as $$E_{out}(t) = E_{in}(t) \cdot e^{j\frac{u(t)}{V_\pi}\pi}.$$

In the same way, the transfer function of the MZM composed of two phase modulators can be expressed as $$E_{out}(t) = E_{in}(t) \cdot \frac{1}{2} \cdot \left(e^{j\frac{u1(t)}{V_{\pi 1}}\pi} + e^{j\frac{u2(t)}{V_{\pi 2}}\pi}\right).$$

In the Coherent Transmission and Detection method, the IQ Modulator can be used as the Optical Modulator. The IQ Modulator can be configured by configuring two MZM Modules in parallel and inserting a Phase Shifter corresponding to n/2 in one path. Each path is used to modulate the in-phase signal and the quadrature signal, respectively, and both intensity and phase cab be modulated.

The Optical IQ Modulator performs in-phase modulation by the control voltage $u_I(t)$ by the in-phase signal, quadrature modulation by the control voltage $u_Q(t)$ by the quadrature signal, and then synthesizes them to form the IQ Modulated Signal. The Transfer Function of Optical IQ Modulation can be expressed as $$E_{out}(t) = E_{in}(t) \cdot \frac{1}{2} \cdot \left( \cos\left( \frac{u_I(t)}{V_\pi} \frac{\pi}{2} \right) + j \sin\left( \frac{u_Q(t)}{V_\pi} \frac{\pi}{2} \right) \right).$$

Hereinafter, with reference to FIG. 28, transmit beamforming optics will be described in detail.

The Transmit Beamforming Optics unit is an optical system that forms a transmission beam toward the receiving end using the optical modulated signal received from the Optical Signal Processor unit.

The Transmit Beamforming Optics unit may be implemented based on at least one of an array antenna, a collimator that generates parallel beams, a lens, and a metasurface.

Specifically, the Transmit Beamforming Optics unit may be implemented as a single element device (e.g. Array Antenna or Lens, etc.), depending on the implementation method, and may be implemented based on various combinations of multiple components (e.g. Array Antenna+Lens, Lens+Metasurface, etc.).

Transmit Beamforming Optics can radiate through an Antenna Array, similar to an existing RF transmitter. For configuration and control of beamforming, the antenna array is composed of an optical phased array, and can perform beam control according to phase control.

Optical Phased Array is an Electrical Beamforming Optics that performs beam control by controlling the phase of the signal received through the waveguide type. Optical Phased Array is based on Silicon Photonics technology and performs phase conversion based on electrical control for beam control. Beam control angle, energy consumption, response time, and resolution may vary depending on the applied technology.

Liquid Crystal-based Beamforming Optics is an Electrical Beamforming Optics that controls the direction of the beam by controlling the phase of multiple points where the Optical Source radiates, similar to the Optical Phased Array method. At this time, phase control of each radiation point can be achieved through the following operations.

The direction of the molecules of the Liquid Crystal is changed by controlling the voltage applied to the Liquid Crystal at each point (e.g. rotation of molecules). As the direction of the molecules of Liquid Crystal changes, a phase difference occurs, and through this, phase control can be achieved at each radiation point.

Liquid Crystal-based Beamforming Optics has the following advantages. Liquid Crystal-based Beamforming Optics is easy to miniaturize, and can set the distance between radiation points to be small, and is easy to form narrow beams and fine resolution based on a large number of radiation points. In addition, Liquid Crystal-based Beamforming Optics is real-time programmable based on voltage control and can operate even with a small driving voltage.

However, Liquid Crystal-based Beamforming Optics has a limited controllable steering angle and is affected by diffraction efficiency.

FIG. 28 illustrates an element for configuring a beamforming optical system according to an embodiment of the present disclosure. Specifically, FIG. 28 illustrates the operation of the Lens and Collimator, which are optical elements for configuring Mechanical Beamforming Optics.

Referring to FIG. 28, the Lens and Collimator can be used for 1) Collimating, 2) Diverging (or Broadening) or 3) Converging (or Focusing) of incident light. At this time, light incident from the Optical Source can be controlled through an optical system combining a single lens or multiple lenses.

Generally, the Light Point Source takes the form of a Spherical Wavefront unless additional processing is applied. When observed from a location far away from the Light Point Source, it can be observed as a Plane Wave, but because the Beam Divergence is very large, a large Beam Divergence Loss may occur.

Therefore, from a transmitter's perspective, the conversion of a light source into a plane wave (collimated beam conversion) is an important factor in terms of transmission efficiency. This is the same concept as focusing energy by controlling the 3 dB beamwidth to be small through beamforming in an RF communication system. Here, Spherical Wavefront refers to a state in which the wavefront with the same phase is curved in terms of the direction in which the optical source travels, and Plane Wave (or Plane Wavefront) refers to a state in which wavefronts with the same phase are flat in terms of the direction in which the optical source travels.

Mechanical Beam Steering can be applied to the Plane Wave Optical Source refined by a Lens or Collimator to steer it toward the receiver. Mechanical Beam Steering can be either gimbal-based or mirror-based, and there is a problem with the large size of the device for mechanical operation. The Gimbal based Beam Steering method, since it performs beam steering by moving or rotating based on a motorized platform, can provide a wide steering angle, so it can be used in environments where the size constraints of the transmitter device are not high and a high control angle is required, such as Ground-to-Satellite Communication. However, due to the nature of mechanical operation, coarse steering is difficult, and its size is too large to be used in mobile devices.

Mirror based beam steering method utilizes fast-steering mirror based on beam deflection. Fast steering and high steering resolution can be provided based on mirror mechanical control. On the other hand, due to the problem of the steering angle being limited by the mirror's control angle and the nature of mechanical steering, the size is too large to be used in mobile devices.

Metasurface-based Beamforming Optics can control beams based on the interaction of incident waves (e.g. scattering, absorption, luminescence, heat generation, etc.) with a microstructure consisting of a 2D Dense Array (e.g. combination of inductors, insulators, conductors, etc.). A microstructure (Meta Building Block, MBB) is a material that has electromagnetic properties and is designed to be smaller than the wavelength of electromagnetic waves, and is also called a meta material. The Wavelength, Phase, Polarization, and Amplitude of the incident signal can be changed by interaction with the microstructure. Each microstructure can be divided into a passive structure, whose function is determined at the process stage, and an active structure, whose function changes depending on the method or degree of applying an electric field even after the process. Functionally, it can be divided into Meta-Grating, which has a diffraction grating function whose diffraction or reflection coefficient changes depending on the wavelength of the incident signal, and Meta-Lens, which controls the aberration caused by the difference in the refractive index of the wavelength of the incident signal.

Through the Beamforming Optics device described above, the target beam divergence can be controlled. The inhomogeneous polarization pattern proposed in the present disclosure can be expanded to the size of the target beam and transmitted by a beam divergence controller.

Hereinafter, with reference to FIGS. 29 and 30, the structure of a receiver that receives an inhomogeneous polarization beam will be examined.

Receiver Structure

FIG. 29 illustrates an example of a receiver structure that receives an inhomogeneous polarization pattern according to an embodiment of the present disclosure.

Referring to FIG. 29, the polarization pattern receiver can be implemented as an optical filter unit for receive beamforming optics that receives the beam through the receiver aperture and polarization pattern detection, an optical detector unit for optical-to-electric conversion, and a digital signal processor for electrical demodulation.

Receive Beamforming Optics

The Receive Beamforming Optics unit is an optical system that generates a receiving beam from the target signal received from the receiver aperture, such as an array antenna, collimator, lens, and metasurface. Depending on the implementation method, the Receive Beamforming Optics unit may be implemented as a single element device (e.g. Array Antenna or Lens, etc.) or may be implemented based on various combinations of multiple components (e.g. Array Antenna+Lens, Lens+Metasurface, etc.). In Receive Beamforming Optics, the optical signal incident through the lens is collected and applied to the optical fiber. The applied beam is delivered to the Optical Filter.

Optical Filter

The optical filter unit for polarization pattern detection may be composed of a wavelength filter, an optical coupler, and a polarization filter.

The Wavelength Filter is an optical filter device that passes only the desired signal among the received signals and functions as a bandpass filter. A general transmissive optical filter is a bandpass filter that passes a specific wavelength and has non-tunable characteristics and high insertion loss, but has cost-effective characteristics that can be implemented economically.

Fiber Bragg Grating (FBG) devices have low insertion loss and cost-effective characteristics, but cannot be modified after processing due to the non-tunable characteristics.

Arrayed Waveguide Grating (AWG) devices can be used flexibly by branching into multiple wavelengths and selecting the desired wavelength, but have a relatively wide passband and high insertion loss.

The Waveshaper device is a device that converts the optical signal input in free space into space according to the wavelength and performs wavelength selection here. The biggest feature of this device is that it uses liquid crystal on silicon (LCOS) for wavelength selection, so the wavelength selectivity can be adjusted according to the electrical signal, but it has the disadvantage that the cost of implementing the device is very high.

The polarization state detect operation is performed as follows. Polarization state information is obtained through the Polarization Filter of the Optical Filter unit and the Photo Detector unit of the Optical Detector.

The configuration of the polarization state detector that performs polarization state detection may vary depending on the configuration and type of the polarization filter and photo detector. Hereinafter, description will be made with reference to FIG. 30.

FIG. 30 illustrates another example of a receiver structure that receives an inhomogeneous polarization pattern according to an embodiment of the present disclosure. Specifically, FIG. 30 illustrates the structure of a receiver implemented to measure the Stokes Parameter.

Referring to FIG. 30, only the desired signal passes through the Wavelength Filter, and the passed signal is split into four signals at the Optical Coupler. At this time, the ratio of the four branched signals is the same, but the ratio may vary depending on the purpose. Each branched Path is connected to a different Polarization Filter (0~3).

For example, Polarization Filter 0 is a horizontal polarizer, Polarization Filter 1 is a vertical polarizer, Polarization Filter 2 is a +45 degree Linear Polarizer, and Polarization Filter 3 can be composed of a series connection of QWP and +45 degree Polarizer.

In addition, the Optical Filter unit may additionally include an Optical Amplifier to improve the quality of the received signal and an Adaptation Filter to correct channel effects.

Optical Detector

The intensity of the signal passing through the polarizer in each path is measured by an optical detector. In the optical detector, the light signal intensity is converted into photocurrent in a photo detector or photodiode. The photocurrent is converted to voltage through a low-pass filter and a transimpedance amplifier (TIA).

There are a total of 4 powers measured at the optical detector of each path, which are P0, P1, P2, and P3, respectively. Among them, P and P1 are combined and applied to the ADC of the Digital Signal Processor. P0 to P3 can be organized as Equation 3 below according to the polarizer characteristics each passed.

$$P_0 = |E_x|^2$$
$$P_1 = |E_y|^2$$
$$P_2 = \frac{1}{2}(E_x^2 + E_y^2 + 2E_xE_y \cos \delta)$$
$$P_3 = \frac{1}{2}(E_x^2 + E_y^2 + 2E_xE_y \sin \delta)$$

[Equation 3]

Therefore, through the output power, Stokes Parameter can be measured/determined by the following equation.

$$S_0 = P_0 + P_1$$
$$S_1 = P_0 - P_1$$
$$S_2 = 2P_2 - P_0 - P_1$$
$$S_3 = 2P_3 - P_0 - P_1$$

[Equation 4]

The polarization state can be obtained through the Stokes Parameter obtained through Equation 3 above.

Digital Signal Processor

The digital signal processor consists of an analog-to-digital converter (ADC) unit that converts the electrical analog signal converted from the optical detector into a digital signal, a demodulator that demodulates digital signals, and a decoder that performs decoding on demodulated signals. The digital signal processor decodes the signal transmitted from the transmitting end and obtains data.

The Analog-to-Digital Converter (ADC) unit converts the Electrical Analog Signal converted from the Optical Detector into a Digital Signal. The ADC unit can convert analog signals into digital signals through electrical filters and down-sampling. A separate ADC performs conversion for each of the X-polarization signal and Y-polarization signal. In the case of Coherent Transmission and Detection, which performs IQ Modulation for each polarization signal, each polarization distinguishes between an in-phase signal and a quadrature signal, and a separate ADC performs conversion for each. The converted digital signal is applied to a demodulator.

A demodulator is a module that performs demodulation based on a digital signal converted from an ADC and obtains a matched coded bit. A demodulator can be implemented depending on the demodulation method used, and the configuration of the demodulator may vary depending on the IM/DD method and the phase-based modulation method. Additionally, the configuration of the demodulator may vary depending on whether the single carrier method or the multicarrier method is applied for each method.

The decoder is a module that obtains digital data by decoding the coded bit stream received from the transmitter. The decoder can be implemented based on the Channel Coding method used in the encoder.

Below, beam alignment based on Inhomogeneous Polarization is examined in detail.

Inhomogeneous Polarization based Beam Alignment

Hereinafter, with reference to FIGS. 31 and 32, a beam alignment system based on an inhomogeneous polarization pattern will be described in detail.

FIG. 31 is a diagram illustrating detection of an inhomogeneous polarization pattern according to an embodiment of the present disclosure. Based on detection of the inhomogeneous polarization pattern, the beam of the transmitting end can be aligned.

Specifically, beam alignment can be performed as follows. The transmitting end broadcasts the inhomogeneous polarization pattern. The receiving end detects polarization and feeds back the detected polarization information to the transmitting end. Hereinafter, the above-described operation will be described in detail with reference to FIG. 32.

FIG. 32 is a diagram for explaining a beam alignment operation based on an inhomogeneous polarization pattern according to an embodiment of the present disclosure.

Referring to FIG. 32, the beam alignment operation may be performed in the following order.

1. The transmitter (Tx) broadcasts an Inhomogeneous Polarized Broad beam.

2. The receiver (Rx) detects the polarization state (or polarization pattern) where the receiver is located.

3. The receiver (Rx) feeds back polarization information including a polarization pattern or Stokes parameter to the transmitter (Tx).

4. The transmitter (Tx) searches for a polarization pattern related to the location of the receiver (Rx) in the entire pattern of the previously transmitted inhomogeneous polarized broad beam based on the polarization information obtained through the feedback. The transmitter (Tx) may determine the direction of the beam to the receiver based on the location of the searched polarization pattern. The transmitter (Tx) performs beam alignment based on the determined beam direction.

Hereinafter, the information fed back by the receiver (i.e. polarization information) will be described in detail.

Feedback Information

A receiver capable of detecting the above-described polarization state can recognize/determine the polarization state through the Stokes parameter. Matters related to the receiver aperture related to detection of polarization state will be described below with reference to FIG. 33.

FIG. 33 illustrates a detection point of a polarization pattern according to a receiver aperture according to an embodiment of the present disclosure. Referring to FIG. 33, 1, 4 or 9 detection points related to the polarization pattern are shown. When the aperture is one, the number of detection points is one.

When the aperture is multiple apertures or a quantized single aperture, the number of detection points may be multiple (e.g. 4, 9). Hereinafter, feedback operations when the number of detection points is one and multiple are examined in order.

Single Point Feedback

When performing Single Polarization State Detection through Single Receiver Aperture, the receiver can feed back one polarization state to the transmitter. Hereinafter, the format of the information to be fed back will be described in detail with reference to FIG. 34.

FIG. 34 is a diagram illustrating a format of polarization state information fed back according to an embodiment of the present disclosure. Referring to FIG. 34, the polarization state information fed back may be based on a Stokes Vector or a Poincare Sphere Angle Vector.

According to one embodiment, the receiver may feed back the Stokes vector based on the measured Stokes parameter. The Stokes Vector is a vector including all Stokes Parameters (S0 to S3) and is used to deliver polarization state information and total intensity. The Stokes Vector can be expressed as Equation 5 below.

$$\text{Stokes Vector } S = [S_0, S_1, S_2, S_3] \quad \text{[Equation 5]}$$

for a Single Polarization Detection Point

According to one embodiment, when the receiver feeds back one polarization state, the receiver may feed back a Poincare Sphere Angle Vector based on the measured Stokes parameter.

The Poincare Sphere Angle Vector is a vector that expresses only polarization state information on a unit Poincare Sphere. The Poincare Sphere Angle Vector is used to deliver only polarization state information without information about total intensity. The Poincare Sphere Angle Vector can be expressed as Equation 6 below.

$$\text{Poincare Sphere Angle Vector } \Omega = [\Psi, X] \quad \text{[Equation 6]}$$

for a Single Stokes Vector

In Equation 6, $\Psi$ is the orientation angle, represents the elliptical direction of elliptical polarization, and satisfies $$\Psi = \frac{1}{2}\arctan\left(\frac{S_2}{S_1}\right).$$

X is an ellipticity angle, which represents the degree of ellipticity of elliptical polarization and satisfies $$X = \frac{1}{2}\arctan\left(\frac{S_3}{\sqrt{S_1^2 + S_2^2}}\right).$$

Below, the feedback operation is examined when the number of detection points is multiple.

Multiple Point Feedback

When the receiver performs multiple polarization state detection, multiple polarization states can be fed back.

The multiple polarization state detection may be performed based on 1) multiple receiver apertures or 2) a single receiver aperture and multiple photodetector arrays.

According to one embodiment, the receiver may feed back Stokes Vectors based on the measured Stokes Parameter. The Stokes vector for M detection points can be expressed as Equation 7 below.

Stokes Vector $S_i = [S_0^{(i)}, S_1^{(i)}, S_2^{(i)}, S_3^{(i)}]$ for [Equation 7]

the $i^{th}$ Polarization Detection Point, $i = 1, \ldots, M$

According to one embodiment, when the receiver feeds back multiple polarization states, the receiver may feed back a Poincare Sphere Angle Vector based on the measured Stokes parameter. The Poincare Sphere Angle Vector for M detection points can be expressed as Equation 8 below.

Poincare Sphere Angle Vector $\Omega_i = [\Psi^{(i)},$ [Equation 8]

$X^{(i)}]$ for the $i^{th}$ Single Stokes Vector, $i = 1, \ldots, M$ $\Psi^{(i)}$ is the orientation angle, which represents the elliptical direction of the ith elliptical polarization and satisfies $$\Psi^{(i)} = \frac{1}{2}\arctan\left(\frac{S_2^{(i)}}{S_1^{(i)}}\right).$$

$X^{(i)}$ is the ellipticity angle, which represents the ellipticity of the ith elliptical polarization and satisfies $$X^{(i)} = \frac{1}{2}\arctan\left(\frac{S_3^{(i)}}{\sqrt{(S_1^{(i)})^2 + (S_2^{(i)})^2}}\right).$$

Feedback information based on the above-described embodiments may be quantized and transmitted by a pre-arranged method. Additionally, feedback information based on the above-described embodiments may be quantized by a pre-arranged method and then indexed and transmitted.

Below, the search algorithm for the polarization state pattern is examined.

Polarization State Pattern Search Algorithm

When performing a beam search on the transmitter, the transmitter searches for the beam direction to the receiver from the inhomogeneous polarization pattern transmitted from the transmitter based on the single polarization state information fed back by the receiver.

When performing a beam search at the receiver, the beam direction to the receiver is searched from the inhomogeneous polarization pattern transmitted from the transmitter, based on the single polarization state information detected by the receiver. Hereinafter, beam search will be described sequentially divided into a case where there is one detection point and a case where there are multiple detection points.

Polarization State Pattern Search Algorithm for Single Point

The beam direction to the receiver is searched from the inhomogeneous polarization pattern based on the polarization state information detected (or fed back) from a single point perspective.

For example, the inhomogeneous polarization pattern may be defined in advance based on a high resolution polarization pattern matrix, as shown in FIG. 35.

FIG. 35 illustrates a polarization pattern matrix related to an inhomogeneous polarization pattern according to an embodiment of the present disclosure.

Referring to FIG. 35, the inhomogeneous polarization pattern can be quantized into an N×N high resolution polarization pattern matrix.

The receiver (transmitter) can compare the detected (or fed back) polarization state information with each polarization (i.e. each element of the matrix) of the high resolution polarization pattern matrix, and select the most similar polarization state.

For example, the index of the most similar polarization state may be selected based on the Euclidean Distance, as shown in Equation 9 below.

$$(i, j) = \underset{i,j}{\arg\min} \sqrt{\begin{array}{c}(P_{i,j}(S_1) - S_1^{(detected)})^2 + (P_{i,j}(S_2) - S_2^{(detected)})^2 + \\ (P_{i,j}(S_3) - S_3^{(detected)})^2\end{array}},$$ [Equation 9]

$i, j = 1, \ldots, N$

Here, $P_{i,j}(S_k)$ means the kth Stokes Parameter of the (i,j)th Polarization State in the High Resolution Polarization Pattern Matrix. $S_k^{(detected)}$ is the kth Stokes Parameter derived through the detected (or fed back) Polarization State. At this time, Stokes Parameter includes S0, S1, S2, and S3, but among them, S1 to S3 can be used for polarization detection. Specifically, since S0 is Total Intensity, S1 to S3 corresponding to the polarization state can be used for polarization detection. Therefore, excluding the Intensity that can be changed by Channel, $P_{i,j}(S_k)$ and $S_k^{(detected)}$ can be obtained through Stokes Parameters normalized by $P_{i,j}(S_0)$ and $S_0^{(detected)}$, respectively. For example, Equation 9 can be constructed through $\overline{P_{i,j}(S_k)} = P_{i,j}(S_k)/P_{i,j}(S_0)$ or $\overline{S_k^{(detected)}} = S_k^{(detected)}/S_0^{(detected)}$.

The operation according to the above embodiment can be equally applied even when the format of the information fed back is a Poincare Sphere Angle Vector. Specifically, even when the detected (or fed back) Polarization State information is a Poincare Sphere Angle Vector, similarity is measured in the same manner as described above, and based on this, the index of the polarization state can be determined.

The beam index can be determined through the index of the polarization state selected in the High Resolution Polarization Pattern Matrix. For example, if the polarization state index and the beam index are mapped 1:1, it can be selected based on the following Equation.

$$b = (i-1)*N + (j-1)*N, i, j = 1, \ldots, N, b = 1, \ldots, N^2 \quad \text{[Equation 10]}$$

In Equation 10 above, b is the beam index, i is the row index of the N×N High Resolution Polarization Pattern Matrix, and j is the column index of the N×N High Resolution Polarization Pattern Matrix.

The index of the polarization state and the beam index may be mapped as M:1. Here M>1. In this case, the resolution of beam selection may be operated lower than the resolution of selection of the polarization state.

When the above-described operation is performed at the transmitting end, the transmitting end can perform transmit beamforming toward the receiving end using the selected Beam Index.

When the above operation is performed at the receiving end, the receiving end can request Transmit Beamforming by feeding back the selected Beam Index to the transmitting end.

Below, a polarization state pattern search algorithm when there are multiple detection points will be discussed.

Polarization State Pattern Search Algorithm for Multiple Points

Based on Polarization State information detected (or fed back) from the Multiple Point perspective, the beam direction to the receiver is searched from the Inhomogeneous Polarization Pattern. Hereinafter, description will be made with reference to FIG. 36.

FIG. 36 is a diagram for explaining a search operation of a polarization pattern related to multiple detection points according to an embodiment of the present disclosure.

Referring to FIG. 36, it is assumed that 9 Stokes vectors for 9 detection points are detected (or fed back). At this time, a pattern search may be performed according to the degree of alignment of the transmitting and receiving ends.

In the case where the transmitting and receiving ends are aligned facing each other, the detected pattern can be searched for in the inhomogeneous polarization pattern.

On the other hand, in the case where the transmitter and receiver are facing each other, but the receiver is rotated from the perspective of the multiple detection points, the searches in the inhomogeneous polarization patterns must be performed considering the rotation of the pattern.

When the optical axis facing the transceiver is the z-axis, if the receiver is tilted to the x-axis or y-axis, the pattern measured at the receiver is scaled to the x-axis or y-axis (X/Y scaled case). Searches in the inhomogeneous polarization pattern must be performed considering the x-axis/y-axis scaling of the pattern. In addition, scaling occurs along the x-axis and y-axis depending on the distance between the transmitter and receiver, so even in this case, searches in the inhomogeneous polarization patterns must consider the x-axis/y-axis scaling of the pattern.

As described above, the following effects are derived from the operation of searching the beam based on the polarization state information detected (fed back) from the perspective of multiple detection points.

Through the search operation of the beam direction from the inhomogeneous polarization pattern to the receiver, not only the direction of the beam but also the rotation, tilting, and distance information of the receiver can be obtained. Through this, localization of the receiver becomes possible.

In the above, the polarization pattern search from the perspective of multiple detection points can be performed by measuring the similarity between patterns (or between matrices and vectors) in the same way as the polarization pattern search from the perspective of a single detection point. Based on the searched polarization pattern, beam selection and feedback can be performed the same as beam selection from a single detection point perspective.

Procedures of Inhomogeneous Polarization based Beam Alignment

Hereinafter, the inhomogeneous polarization based beam alignment procedure will be described with reference to FIGS. 37 to 39.

FIG. 37 is a diagram for explaining an inhomogeneous polarization-based beam alignment procedure according to an embodiment of the present disclosure.

Referring to FIG. 37, an inhomogeneous polarized beam is broadcast and a beam search is performed at the transmitting end (Tx) based on feedback information.

1-1) Transmit Inhomogeneous Polarized Broad Beam

The transmitting end transmits an inhomogeneous polarized broad beam through pre-arranged physical resources (Time, Frequency) for Beam Search. The inhomogeneous polarized broad beam can be broadcast by the transmitting end.

The inhomogeneous polarized broad beam is the inhomogeneous polarization beam generated by the inhomogeneous polarization beam generator of the transmitter that has been spread out through the beam divergence controller so that it can be transmitted to the target area.

1-2) Polarization Detection

The receiving end receives an inhomogeneous polarized broad beam through pre-arranged physical resources (Time, Frequency) for the beam search. The receiving end detects the polarization of the beam received at the location of the receiving end.

Through polarization detection, polarization state information, which is a value measured by the polarization detector of the receiver, is obtained.

Polarization state information may be single information in the case of Single Point Detection, and may be pattern information in the case of Multiple Point Detection.

Polarization State Pattern information related to Single Point Detection can be defined as a Stokes Vector or Poincare Sphere Angle Vector.

Polarization State Pattern information related to Multiple Point Detection may be defined as multiple Stokes Vectors or Poincare Sphere Angle Vectors.

1-3) Polarization Information Feedback

The receiving end feeds back the measured polarization state information to the transmitting end through pre-arranged/defined physical resources (Time, Frequency) or physical channels (e.g. xPUSCH, xPUCCH, etc.) for polarization information feedback.

The polarization state information may be polarization information defined as Stokes vector(s) or Poincaré sphere angle vector(s). The polarization state information fed back may be quantized information based on a predefined method or an index representing the quantized information.

The amount of polarization state information fed back (or the size of the information) may be predefined/configured by a prearranged Physical Resource or Physical Channel.

1-4) Search Polarization Pattern

The transmitting end matches the Polarization Information fed back from the receiving end with the Inhomogeneous Polarized Broad Beam to find the beam direction from the transmitter to the receiver.

In the case of Polarization Information corresponding to a Single Point, the most similar Polarization State is found by matching a single Stokes Vector or Poincare Sphere Angle Vector with an Inhomogeneous Polarized Broad Beam.

In the case of Polarization Information corresponding to Multiple Points, the most similar Polarization State Pattern is found by matching the same number, as the number of Multiple Points, of Stokes Vectors or Poincare Sphere Angle Vectors with the Inhomogeneous Polarized Broad Beam.

Search for Polarization State or Polarization State Pattern can be performed based on the above-described similarity. Specifically, the transmitting end can search for the Polarization State or Polarization State Pattern with the maximum similarity to information quantized by the High Resolution Polarization Pattern Matrix.

1-5) Beam Selection

The transmitting end selects the center direction of the beam for Unicast Transmission or Multicast Transmission based on the Polarization State or Polarization State Pattern searched in 1-4).

The center direction of the narrow beam can be selected based on the direction of the Polarization State or Polarization State Pattern, and the size of the beam divergence can be determined depending on the purpose at the transmitting end (e.g. the type of information delivered to the receiving end).

1-6) Data Transmission

The transmitting end performs (unicast or multicast-based) data transmission through the beam determined according to the purpose of the transmitting end in the direction of the center of the beam determined in 1-5). At this time, the transmitted data may be User Data or Control Data.

FIG. 38 is a diagram for explaining an inhomogeneous polarization-based beam alignment procedure according to another embodiment of the present disclosure.

Referring to FIG. 38, a fixed inhomogeneous polarized beam is transmitted and a beam search is performed at the receiving end (Rx).

2-1) Predefined Inhomogeneous Polarized Beam Pattern Information

The transmitting end and the receiving end can exchange information about the inhomogeneous polarized beam pattern in advance. As an example, the transmitting end can configure information about the inhomogeneous polarized beam pattern to the receiving end. Information about the inhomogeneous polarized beam pattern can be defined in advance at the design stage of the device.

As an example, information about the inhomogeneous polarized beam pattern may be quantized into a High Resolution Polarization Pattern Matrix.

As an example, information about the inhomogeneous polarized beam pattern may be defined as beam combination information that generates the inhomogeneous polarization pattern.

Beam Combination information is the generation information of each beam used in the inhomogeneous polarization beam generator of the transmitter. For example, information of $[m, A_m, \theta_m, |P_m\rangle]$ may be defined in advance for a specific element Beam m. Here, m is the LG Beam order of the element beam, $A_m$ is the Amplitude information of the element beam, $\theta_m$ is the phase information of the element Beam m, and $|P_m\rangle$ is the polarization information of element Beam m.

2-2) Transmit Inhomogeneous Polarized Broad Beam

The transmitting end transmits an inhomogeneous polarized broad beam through pre-arranged physical resources (Time, Frequency) for Beam Search. At this time, the inhomogeneous polarized broad beam is broadcast by the transmitting end.

The inhomogeneous polarized broad beam is a beam that spreads the inhomogeneous polarization beam generated by the inhomogeneous polarization beam generator of the transmitter so that it can be transmitted to the target area through a beam divergence controller.

2-3) Polarization Detection

The receiving end receives an inhomogeneous polarized broad beam through pre-arranged physical resources (Time, Frequency) for Beam Search. The receiving end detects the polarization of the beam received at the location of the receiving end.

Through polarization detection, polarization state information, which is a value measured by the polarization detector of the receiver, is obtained.

Polarization State information may be single information in the case of Single Point Detection, and may be pattern information in the case of Multiple Point Detection.

Polarization State Pattern information related to Single Point Detection may be defined as a Stokes Vector or Poincare Sphere Angle Vector.

Polarization State Pattern information related to Multiple Point Detection may be defined as multiple Stokes Vectors or Poincare Sphere Angle Vectors.

2-4) Search Polarization Pattern

The receiving end matches the Polarization Information obtained in 2-3) with the Inhomogeneous Polarized Broad Beam to find the beam direction from the transmitter to the receiver.

In the case of Polarization Information corresponding to a Single Point, the most similar Polarization State is found by matching a single Stokes Vector or Poincare Sphere Angle Vector with an Inhomogeneous Polarized Broad Beam.

In the case of Polarization Information corresponding to Multiple Points, the most similar Polarization State Pattern is found by matching the same number, as the number of Multiple Points, of Stokes Vectors or Poincare Sphere Angle Vectors with the Inhomogeneous Polarized Broad Beam.

Search for Polarization State or Polarization State Pattern can be performed based on the above-described similarity.

As an example, the receiving end may search for the Polarization State or Polarization State Pattern that has the maximum similarity to the information quantized by the High Resolution Polarization Pattern Matrix pre-arranged/defined in 2-1).

As an example, the receiving end can generate an inhomogeneous polarization pattern reconstructed through the beam combination information pre-arranged in 2-1) as a High Resolution Polarization Pattern Matrix using a pre-arranged quantization method. The receiving end can search for the Polarization State or Polarization State Pattern with the maximum similarity to the polarization information corresponding to the detailed index of the generated High Resolution Polarization Pattern Matrix.

2-5) Decide Beam Index

The receiving end selects the center direction of the beam for data transmission based on the direction of the polarization state or polarization state pattern found in 2-4).

A pre-arranged Beam Index is determined based on the center direction of the selected beam. The relationship between the direction of the Beam Index and the Polarization State or Polarization State Pattern may be promised in advance.

2-6) Beam Index Feedback

The receiving end feeds back the Beam Index determined in 2-5) to the transmitting end through pre-arranged physical resources (Time, Frequency) or physical channels (e.g. xPUSCH, xPUCCH, etc.) for Beam Index Feedback.

2-7) Beam Selection

The transmitting end selects the center direction of the beam for Unicast Transmission or Multicast Transmission based on the Beam Index fed back in 2-6).

The center direction of the narrow beam is selected based on the Beam Index, and the divergence size of the beam may be determined at the transmitting end depending on the purpose (e.g. type of data being transmitted).

2-8) Data Transmission

The transmitting end performs data transmission (based on Unicast or Multicast) through the beam determined according to the purpose of the transmitting end in the direction of the center of the beam determined in 2-7). At this time, the transmitted data may be User Data or Control Data.

FIG. 39 is a diagram for explaining an inhomogeneous polarization-based beam alignment procedure according to another embodiment of the present disclosure.

Referring to FIG. 39, inhomogeneous polarized beam information is broadcast and beam search is performed at the receiving end (Rx).

3-1) Broadcast Inhomogeneous Polarized Beam Information (e.g., MIB from xPBCH, SIB from xPDSCH, . . . )

The transmitting end and the receiving end can exchange information about the Inhomogeneous Polarized Beam Pattern in advance.

Information about the Inhomogeneous Polarized Beam Pattern can be exchanged in advance through the Initial Access stage or periodic broadcasting.

For example, exchange of Inhomogeneous Polarized Beam Pattern information through Broadcasting can be accomplished through a Master Information Block (MIB) through xPBCH.

For example, information exchange of the Inhomogeneous Polarized Beam Pattern through Broadcasting can be accomplished through a System Information Block (SIB) through xPDSCH.

In other words, Inhomogeneous Polarized Beam Pattern information may be included in existing information that is broadcast (e.g. MIB, SIB).

For example, information about the Inhomogeneous Polarized Beam Pattern may be quantized into a High Resolution Polarization Pattern Matrix.

For example, information about the Inhomogeneous Polarized Beam Pattern may be defined as Beam Combination information that generates an Inhomogeneous Polarization Pattern.

Beam Combination information is the generation information of each beam used in the Inhomogeneous Polarization Beam Generator of the transmitter. For example, information of [m, $A_m$, 0m, $|P_m>$] for a specific element Beam m may be defined in advance. Here, m is the LG Beam order of the element beam, $A_m$ is the Amplitude information of the element Beam m, $\theta_m$ is the phase information of the element Beam m, and $|P_m>$ is the polarization information of element Beam m.

3-2) to 3-8) are the same as 2-2) to 2-8), so duplicate descriptions are omitted.

All of the above operations may be performed for Beam Search in the Initial Access stage, or may be performed periodically for Beam Recovery in the RRC connection state.

All operations according to the above-described embodiment can be performed repeatedly through the Handshake Procedure to improve the accuracy of beam alignment.

All operations according to the above-described embodiment can be performed as a Hybrid Procedure combined with the existing intensity measurement method for beams to improve the accuracy of beam alignment.

According to the above-described embodiment, the following effects are obtained.

In a communication system where a pencil beam is used, the number of physical resources required for beam search can be reduced, and the time required for beam search is also reduced accordingly.

Since the operation according to the above-described embodiment can be combined with the existing beam search procedure, the accuracy of beam alignment can be further improved (obtaining a more accurate center direction of the beam).

In terms of implementation, operations (e.g. operations related to beam alignment based on inhomogeneous polarized beams) according to the above-described embodiments can be processed by the devices (e.g. processors 202a and 202b in FIG. 2) of FIGS. 1 to 5 described above.

Additionally, operations (e.g. operations related to beam alignment based on inhomogeneous polarized beams) according to the above-described embodiments may be stored in memory (e.g. 204a, 204b in FIG. 2) in the form of instructions/programs (e.g. instruction, executable code) for driving at least one processor (e.g. processors 202a and 202b in FIG. 2).

Hereinafter, the above-described embodiments will be described in detail with reference to FIG. 40 in terms of operation of the wireless device (e.g. a first wireless device 200a, a second wireless device 200b in FIG. 2). The methods described below are divided for convenience of explanation, and it goes without saying that some components of one method may be replaced with some components of another method or may be applied in combination with each other.

FIG. 40 is a flowchart for explaining a method performed by a first wireless device in a wireless communication system according to an embodiment of the present disclosure.

Referring to FIG. 40, the method performed by the first wireless device in the wireless communication system according to an embodiment of the present disclosure includes transmitting a signal to which a specific beam is applied (S4010), receiving feedback information (S4020), and determining a beam based on the feedback information (S4030).

In S4010, the first wireless device transmits a signal to which a specific beam is applied to a second wireless device.

According to one embodiment, the first wireless device may be a base station (BS) or a user equipment (UE), and the second wireless device may be a user equipment (UE) or a base station (BS).

According to one embodiment, the signal to which the specific beam is applied may be based on one optical beam including inhomogeneous information.

According to one embodiment, the multiple polarization states may be based on an inhomogeneous polarization pattern matrix. The inhomogeneous polarization pattern matrix may be the high resolution polarization pattern matrix described above.

According to one embodiment, the inhomogeneous polarization pattern matrix may be based on preconfigured polarization information. The preconfigured polarization information may include i) information representing the inhomogeneous polarization pattern matrix, or ii) information representing a beam combination that generates the inhomogeneous polarization pattern matrix.

According to one embodiment, the preconfigured polarization information may be included in a specific information block broadcast by the first wireless device. The specific information block may be based on a master information block (MIB) or a system information block (SIB).

The problem with the beam alignment/beam search procedure according to the prior art in a wireless communication system in which a pencil beam is used is that the number of beams increases due to the use of the pencil beam, so the time and physical resources required for the beam alignment/beam search procedure become excessive. According to the present disclosure, one broad beam based on an inhomogeneous polarization pattern can be used to solve the above-described problem.

According to one embodiment, the one optical beam including inhomogeneous information may be based on one broad beam formed to broadcast a signal to a certain area. The certain area may be based on a cell area related to the first wireless device.

The one or more specific polarization states may be based on the polarization state detected by the second wireless device.

The polarization state detected by the second wireless device may vary depending on a location of the second wireless device within the certain area.

The polarization state detected by the second wireless device may be based on a Stokes vector or a Poincare Sphere Angle Vector.

According to the above-described S4010, the operation of transmitting a signal to which a specific beam is applied by the first wireless device (e.g. 200a in FIG. 2) to the second wireless device (e.g. 200b in FIG. 2) can be implemented by the devices of FIGS. 1 to 5. For example, referring to FIG. 2, one or more processors 202a may control one or more transceivers 206a and/or one or more memories 204a to transmit a signal with a specific beam applied to the second wireless device 200b.

In S4020, the first wireless device receives feedback information generated based on the signal from the second wireless device.

According to one embodiment, the feedback information may represent one or more specific polarization states among the plurality of polarization states.

According to one embodiment, based on the preconfigured polarization information being included in a specific information block broadcast by the first wireless device, the feedback information may include the beam index mapped to the one or more specific polarization states. That is, the second wireless device can determine a beam related to the second wireless device based on the preconfigured polarization information. In this case, signaling overhead can be reduced by the second wireless device feeding back only the beam index to the first wireless device.

According to the above-described S4020, the operation of receiving feedback information generated based on the signal by the first wireless device (e.g. 200a in FIG. 2) from the second wireless device (e.g. 200b in FIG. 2) can be implemented by the devices of FIGS. 1 to 5. For example, referring to FIG. 2, one or more processors 202a may control one or more transceivers 206a and/or one or more memories 204a to receive feedback information generated based on the signal from the second wireless device 200b.

In S4030, the first wireless device determines a beam related to the second wireless device based on the feedback information.

According to one embodiment, the beam related to the second wireless device may be determined based on a beam index mapped to the one or more specific polarization states. At this time, the mapping relationship between the specific polarization state and the beam index may be based on 1:1 mapping or M:1 mapping.

According to one embodiment, the beam index mapped to the one or more specific polarization states may be determined based on one or more specific elements related to the one or more specific polarization states among elements of the inhomogeneous polarization pattern matrix.

According to one embodiment, the determining a beam related to the second wireless device may include calculating a degree of similarity between each element of the inhomogeneous polarization pattern matrix and the one or more specific polarization states and determining an element most similar to the one or more specific polarization states among elements of the inhomogeneous polarization pattern matrix based on the calculated similarity. The similarity may be based on the operation according to FIG. 35.

According to the above-described S4030, the operation of determining a beam related to the second wireless device (e.g. 200b in FIG. 2) based on the feedback information by the first wireless device (e.g. 200a in FIG. 2) may be implemented by the devices of FIGS. 1 to 5. For example, referring to FIG. 2, one or more processors 202a may control one or more transceivers 206a and/or one or more memories 204a to determine a beam related to the second wireless device 200b based on the feedback information.

For convenience, the above-described operations have been described focusing on the operation of the first wireless device. However, this does not mean that application of the method based on the embodiments of the present disclosure is limited to the operation of the first wireless device. That is, the transmission operation of the first wireless device may be interpreted as the reception operation of the second wireless device, and the reception operation of the first wireless device may be interpreted as the transmission operation (e.g. transmitting feedback information) of the second wireless device.

In other words, the above-described operations can be interpreted as a method performed by a second wireless device in a wireless communication system. A method performed by a second wireless device in a wireless communication system may include receiving a signal to which a specific beam is applied from a first wireless device, generating feedback information generated based on the signal, and transmitting the feedback information to the first wireless device. At this time, a beam related to the second wireless device may be determined based on the feedback information.

The signal to which the specific beam is applied may be based on one optical beam including inhomogeneous information.

The feedback information may represent one or more specific polarization states among the plurality of polarization states.

The beam related to the second wireless device may be determined based on a beam index mapped to the one or more specific polarization states.

Here, the wireless communication technology implemented in the device (200a, 200b) of the present disclosure may include LTE, NR, and 6G as well as Narrowband Internet of Things (NB-IoT) for low-power communication. For example, the NB-IoT technology may be an example of a LPWAN (Low Power Wide Area Network) technology, and may be implemented in standards such as LTE Cat NB1 and/or LTE Cat NB2, and is not limited to the above-described name. Additionally or alternatively, the wireless communication technology implemented in the device (200a, 200b) of the present disclosure may perform communication based on the LTE-M technology. For example, the LTE-M technology may be an example of LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the device (200a, 200b) of the present disclosure may include at least one of ZigBee, Bluetooth, and Low Power Wide Area Network (LPWAN) in consideration of low power communication, and is not limited to the above-described name. For example, the ZigBee technology may generate PAN (personal area networks) related to small/low-power digital communication based on various standards such as IEEE 802.15.4, and may be called by various names.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method performed by a first wireless device in a wireless communication system, comprising:
   transmitting a signal to which a specific beam is applied to a second wireless device;
   receiving feedback information generated based on the signal from the second wireless device; and
   determining a beam related to the second wireless device based on the feedback information,
   wherein the signal to which the specific beam is applied is based on one optical beam including inhomogeneous information,
   wherein the inhomogeneous information includes a plurality of polarization states generated based on a birefringent element or a polarization superposition,
   wherein the feedback information represents one or more specific polarization states among the plurality of polarization states, and
   wherein the beam related to the second wireless device is determined based on a beam index mapped to the one or more specific polarization states.

2. The method of claim 1, wherein the plurality of polarization states are based on an inhomogeneous polarization pattern matrix.

3. The method of claim 2, wherein the beam index mapped to the one or more specific polarization states is determined based on one or more specific elements related to the one or more specific polarization states among elements of the inhomogeneous polarization pattern matrix.

4. The method of claim 2, wherein the inhomogeneous polarization pattern matrix is based on preconfigured polarization information, and
   wherein the preconfigured polarization information includes i) information representing the inhomogeneous polarization pattern matrix, or ii) information representing a beam combination that generates the inhomogeneous polarization pattern matrix.

5. The method of claim 4, wherein, based on the preconfigured polarization information being included in a specific information block broadcast by the first wireless device, the feedback information includes the beam index mapped to the one or more specific polarization states.

6. The method of claim 2, wherein the determining a beam related to the second wireless device includes:
   calculating a degree of similarity between each element of the inhomogeneous polarization pattern matrix and the one or more specific polarization states; and
   determining an element most similar to the one or more specific polarization states among elements of the inhomogeneous polarization pattern matrix based on the calculated similarity.

7. The method of claim 1, wherein the one optical beam including inhomogeneous information is based on one broad beam formed to broadcast a signal to a certain area.

8. The method of claim 7, wherein the one or more specific polarization states are based on a polarization state detected by the second wireless device.

9. The method of claim 8, wherein the polarization state detected by the second wireless device varies depending on a location of the second wireless device within the certain area.

10. The method of claim 9, wherein the polarization state detected by the second wireless device is based on a stokes vector or a Poincare Sphere Angle Vector.

11. A first wireless device operating in a wireless communication system, comprising:
one or more transceivers;
one or more processors controlling the one or more transceivers; and
one or more memories operably connected to the one or more processors, and storing instructions that configure the one or more processors to perform operations when being executed by the one or more processors,
wherein the operations include:
transmitting a signal to which a specific beam is applied to a second wireless device;
receiving feedback information generated based on the signal from the second wireless device; and
determining a beam related to the second wireless device based on the feedback information,
wherein the signal to which the specific beam is applied is based on one optical beam including inhomogeneous information,
wherein the inhomogeneous information includes a plurality of polarization states generated based on a birefringent element or a polarization superposition,
wherein the feedback information represents one or more specific polarization states among the plurality of polarization states, and
wherein the beam related to the second wireless device is determined based on a beam index mapped to the one or more specific polarization states.

12. The first wireless device of claim 11, wherein the first wireless device is a base station (BS), and the second wireless device is a user equipment (UE).

13. One or more non-transitory computer-readable medium storing one or more instructions,
wherein the one or more instructions configure the one or more processors to perform operations when being executed by the one or more processors,
wherein the operations include:
transmitting a signal to which a specific beam is applied to a second wireless device;
receiving feedback information generated based on the signal from the second wireless device; and
determining a beam related to the second wireless device based on the feedback information,
wherein the signal to which the specific beam is applied is based on one optical beam including inhomogeneous information,
wherein the inhomogeneous information includes a plurality of polarization states generated based on a birefringent element or a polarization superposition,
wherein the feedback information represents one or more specific polarization states among the plurality of polarization states, and
wherein the beam related to the second wireless device is determined based on a beam index mapped to the one or more specific polarization states.

* * * * *